U S010783247B1

(12) United States Patent
Steinfadt et al.

(10) Patent No.: US 10,783,247 B1
(45) Date of Patent: Sep. 22, 2020

(54) SOFTWARE CLASSIFICATION USING PHYLOGENETIC TECHNIQUES

(71) Applicant: Triad National Security, LLC, Los Alamos, NM (US)

(72) Inventors: Shannon Steinfadt, Los Alamos, NM (US); Taina Immonen, Frederick, MD (US); Thomas Leitner, Los Alamos, NM (US); Michael Kyle, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 307 days.

(21) Appl. No.: 15/841,408

(22) Filed: Dec. 14, 2017

Related U.S. Application Data

(60) Provisional application No. 62/461,508, filed on Feb. 21, 2017.

(51) Int. Cl.
*G06F 21/00* (2013.01)
*G06F 21/56* (2013.01)

(52) U.S. Cl.
CPC .......... *G06F 21/566* (2013.01); *G06F 21/564* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 7,873,947 B1 * | 1/2011 | Lakhotia | ............... | G06F 21/562 717/126 |
| 8,387,139 B2 * | 2/2013 | Jarrett | .................... | G06F 21/566 726/22 |
| 8,528,091 B2 * | 9/2013 | Bowen | .................. | G06F 21/566 726/24 |
| 8,914,406 B1 * | 12/2014 | Haugsnes | ........... | H04L 63/0281 707/769 |
| 9,224,067 B1 * | 12/2015 | Lu | ........................ | H04L 63/1408 |
| 9,996,693 B2 * | 6/2018 | Sun | ........................ | G06F 21/566 |
| 2013/0254890 A1 * | 9/2013 | Wu | ........................ | G06F 21/566 726/23 |

(Continued)

OTHER PUBLICATIONS

Christian Wressnegger et al., "A Close Look on n-Grams in Intrusion Detection: Anomaly Detection vs. Classification," https://www.sec.cs.tu-bs.de/pubs/2013a-aisec.pdf (last accessed Dec. 14, 2017).

(Continued)

*Primary Examiner* — Maung T Lwin
(74) *Attorney, Agent, or Firm* — LeonardPatel PC; Michael Aristo Leonard, II; Sheetal Suresh Patel

(57) ABSTRACT

Software, such as malware, may be classified using phylogenetic techniques. An evolutionary history of a representative set of software programs may be reconstructed to generate a reference phylogeny. Dynamic traces of the representative software programs may be obtained. The dynamic traces may include time-ordered sequences of execution commands extracted from running software binaries. Metrics may be developed using the dynamic traces. One or more unknown software programs may then be classified against the reference phylogeny using the metrics developed using the dynamic traces of the representative set of software programs.

16 Claims, 23 Drawing Sheets

(56) References Cited

U.S. PATENT DOCUMENTS

2016/0036847 A1* 2/2016 McGinley .............. G06F 21/00
  726/25
2017/0286692 A1* 10/2017 Nakajima .............. G06F 21/57

OTHER PUBLICATIONS

Emmanuel Paradis et al., "APE: Analyses of Phylogenetics and Evolution in R Language," Bioinformatics, vol. 20, No. 2, pp. 289-290 (2004).

Igor Santos et al., "Idea: Opcode-Sequence-Based Malware Detection," ESSoS 2010, LNCS 5965, pp. 35-43 (2010).

Joel Berendzen et al., "Rapid phylogenetic and functional classification of short genomic fragments with signature peptides," BMC Research Notes, 5:460 (2012).

Karim et al., "Malware phylogeny generation using permutations of code," J Comput Virol 1: 13-23 (2005).

Naruya Saitou et al., "The Neighbor-joining Method: A New Method for Reconstructing Phylogenetic Trees," Mol. Biol. Evol. 4(4):406-425 (1987).

Rieck et al., "Automatic Analysis of Malware Behavior using Machine Learning," http://www.mlsec.org/malheur/docs/malheur-jcs.pdf (last accessed Dec. 14, 2017).

Rieck et al., "Learning and Classification of Malware Behavior," DIMVA 2008, LNCS 5137, pp. 108-125 (2008).

\* cited by examiner

| 55 | Push | Ebp |
| 8B EC | Mov | ebp, esp |
| 8B 4D 08 | Mov | ecx, [ebp+arg_0] |
| 33 C0 | Xor | eax, eax |
| 80 7D 0C 62 | Cmp | [ebp+arg_4], 62h |
| 0F 95 C0 | Setnz | Al |
| 48 | Dec | Eax |

FIG. 1B

110 push_mov_mov, mov_mov_xor, mov_xor_cmp, xor_cmp_sentz, cmp_sentz_dec

800

1000

FIG. 19
1900
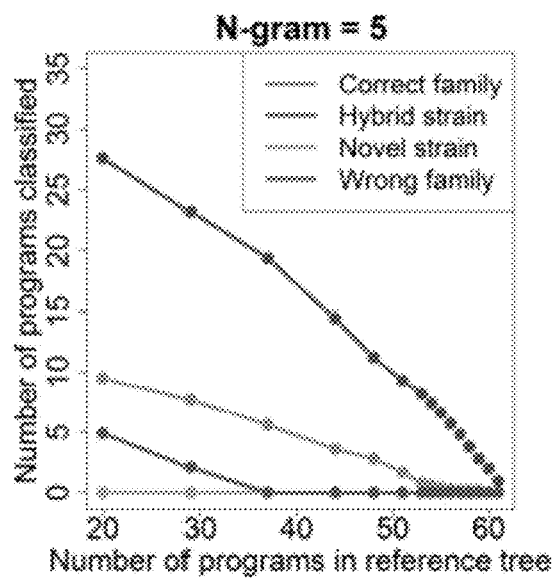
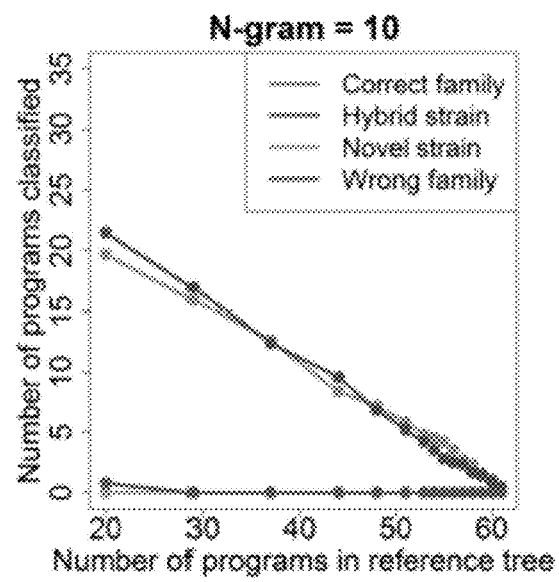
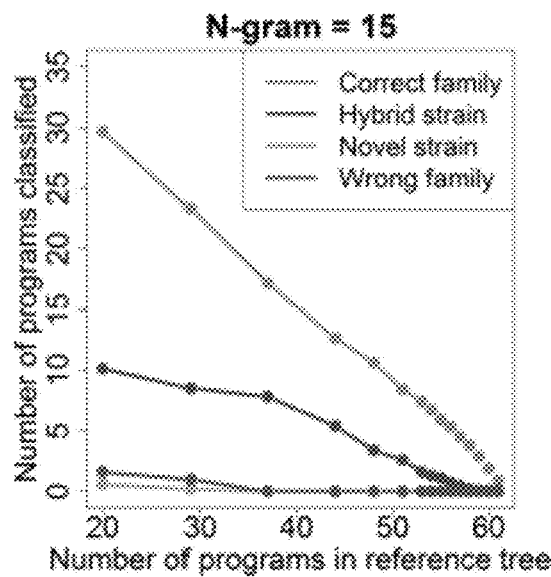
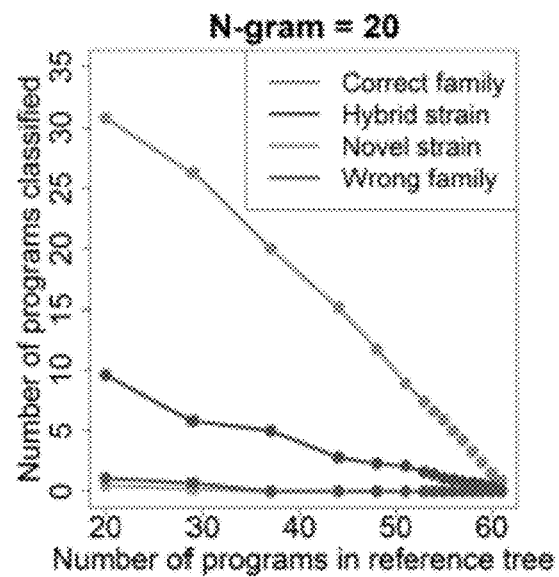

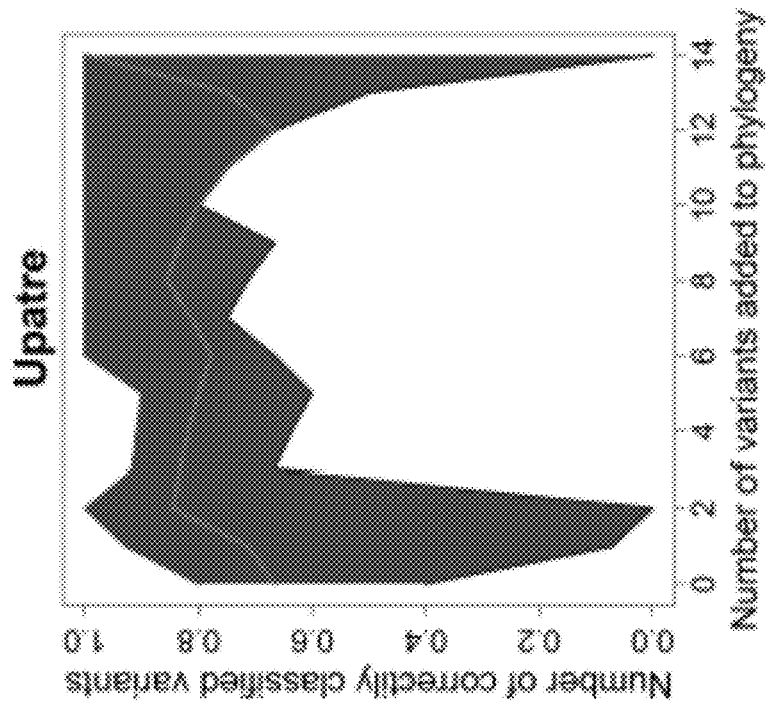
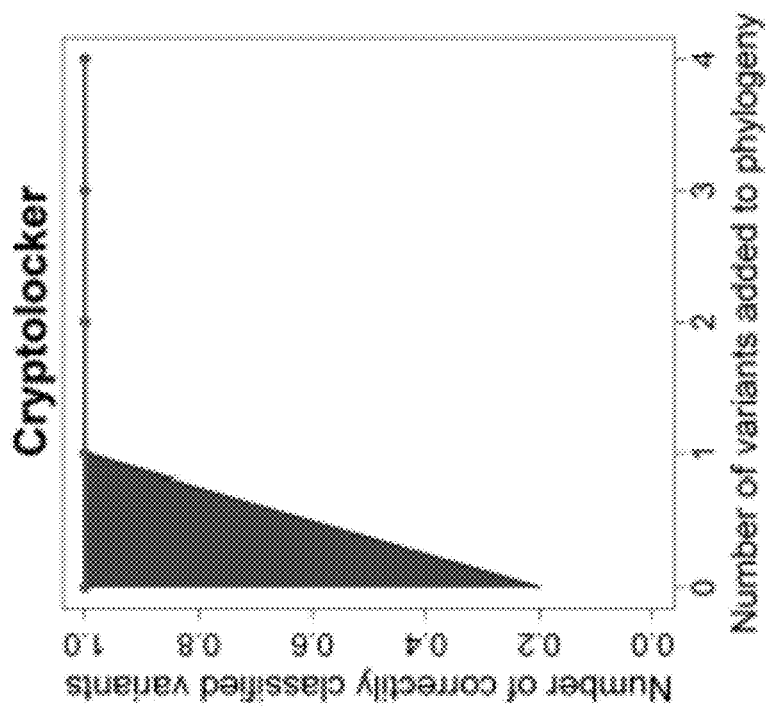
FIG. 20

SOFTWARE CLASSIFICATION USING PHYLOGENETIC TECHNIQUES

CROSS-REFERENCE TO RELATED APPLICATION

This application claims the benefit of U.S. Nonprovisional Patent Application No. 62/461,508 filed Feb. 21, 2017. The subject matter of this earlier filed application is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to software classification, and more particularly, to classification of software using phylogenetic techniques.

BACKGROUND

New malware and non-malware complex software is rarely created from scratch. Rather, it is typically created through systematic reuse of existing code. Accordingly, a majority of malicious software applications in the wild, for instance, are variations of previous malware programs. Current approaches to understanding the behavior of new malicious programs often involves manual analysis, which has failed to keep up with the accelerating pace of attacks. Indeed, human analysts cannot keep pace with these changes. The development of automated methodologies to infer how new programs relate to those seen previously is imperative to understand and respond quickly to emerging threats, as well as to facilitate malware identification and neutralization.

Malware frequently evolves to avoid detection by antivirus scanners through rapid modify-and-release cycles, creating new variants of a common type. Malware authors also use automated malware generation tools, or borrow code from different strains, to generate new hybrid variants. This produces a complex network of shared ancestry between malicious programs. Accordingly, an improved approach to malware classification may be beneficial.

SUMMARY

Certain embodiments of the present invention may provide solutions to the problems and needs in the art that have not yet been fully identified, appreciated, or solved by conventional software classification solutions. For example, some embodiments pertain to classification of software using phylogenetic techniques. Rapid identification of authorship can aid in identifying the attacker, the motivation, and the malware platform the attacker is using to attack with. This intelligence is vital in decision making for defense and response.

Understanding malware "evolution" is possible because new malware is rarely created from scratch. Rather, somewhat analogous to a genome sequence, malware is typically built through the systematic reuse of existing code. Somewhat similar to how it is possible to classify biological viruses from their specific genetic sequences, the software "lineage" indicates authorship and code reuse patterns. Some embodiments identify these patterns and classify malware accordingly. However, some embodiments may use the techniques described herein to identify other types of software. This may be useful for software engineering evolution analysis and code plagiarism detection, for instance. "Cybergenetics" in combination with other tools can lead to a reduction in host-level inspection for a given infection vector. Ideally, it will shorten response time by hours, days, or even months, which is vital for malware defense.

In an embodiment, a computer-implemented method includes obtaining dynamic traces of a representative set of software programs, by a computing system. The dynamic traces include time-ordered sequences of execution commands extracted from running software binaries. The computer-implemented method also includes developing metrics, by the computing system, using the dynamic traces. The computer-implemented method further includes reconstructing, by the computing system, an evolutionary history of the representative set of software programs to generate a reference phylogeny based on the dynamic traces and developed metrics. Additionally, the computer-implemented method includes classifying one or more unknown software programs, by the computing system, against the reference phylogeny.

In another embodiment, a computer-implemented malware classification method includes constructing a reference phylogeny, by a computing system, based on finding matches of similar instruction sequences in dynamic traces of a representative set of software programs by comparing different sequence similarity measures to convert an n-gram match distribution of a pair of dynamic traces into a phylogenetic distance. The computer-implemented method also includes developing metrics, by the computing system, using the dynamic traces. The computer-implemented method further includes classifying one or more unknown software programs, by the computing system, against the reference phylogeny.

In yet another embodiment, a computer program is embodied on a non-transitory computer-readable medium. The program is configured to cause at least one processor to construct a reference phylogeny of a representative set of software programs and classify one or more unknown software programs to a most specific node on the reference phylogeny consistent with a set of n-gram signatures it contains, where the classification determines whether the one or more unknown software programs are variants of an existing family, hybrids of two or more different software programs, or constitute a new software strain.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1A illustrates a disassembly of an example dynamic trace, according to an embodiment of the present invention.

FIG. 1B illustrates the trigram features of the dynamic trace of FIG. 1A, according to an embodiment of the present invention.

FIG. 19 includes graphs illustrating the classification of a sample of programs from the malware corpus to the nodes of a reference phylogeny for different signature n-gram sizes, according to an embodiment of the present invention.

FIG. 20 includes graphs illustrating the number of variants added to the phylogeny versus the number of correctly classified variants, according to an embodiment of the present invention.

DETAILED DESCRIPTION OF THE EMBODIMENTS

Figure 2:
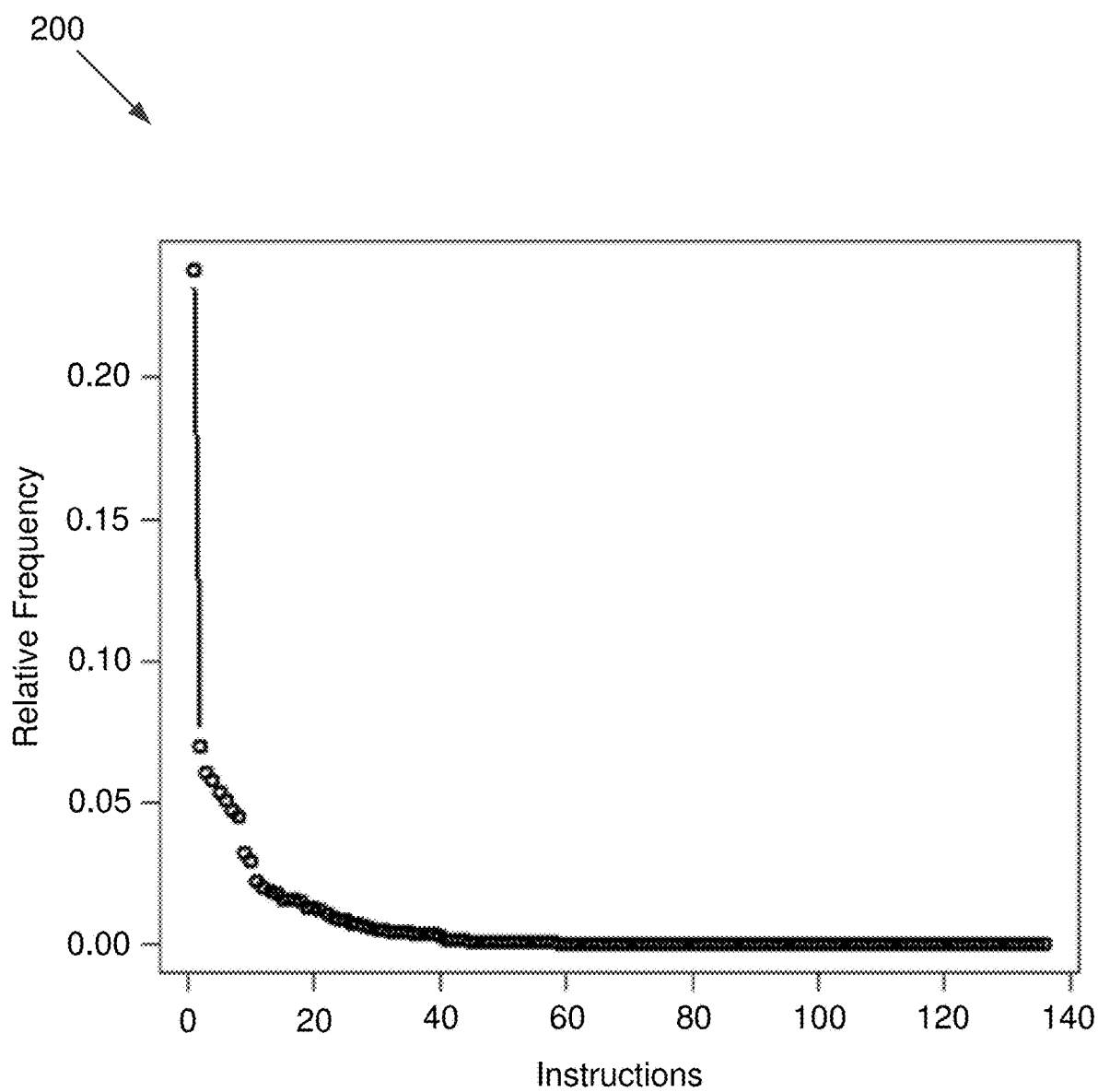
FIG. 2 is a graph illustrating relative frequencies at which instructions occur, according to an embodiment of the present invention.

Some embodiments of the present invention pertain to classification of software, such as malware, using phylogenetic techniques. It should be appreciated that the approaches described herein may be applied to classification of any suitable software without deviating from the scope of the invention. The principal driving forces underlying the evolution of both synthetic and biological pathogens are similar—evading detection and elimination by the host, and infecting new hosts. The development of phylogenetic methodologies has led to groundbreaking advances in understanding the evolution of diverse human pathogens.

Accordingly, some embodiments adapt phylogenetic methodology to: (1) reconstruct the evolutionary history of a representative set of malware to generate a reference phylogeny; and (2) classify unknown malware programs against the reference phylogeny using metrics developed using dynamic traces of the malware. Instead of genomic sequences, malware dynamic traces are compared. These traces are time-ordered sequences of execution commands extracted from running malware binaries. The use of execution commands instead of source code allows analysis of malware that employs detection avoidance techniques, such as code obfuscation.

The first part of the two-step approach of some embodiments involves constructing a reference phylogeny based on finding matches of similar instruction sequences in the dynamic traces of malicious programs. Different methods have been evaluated for constructing phylogenies based on the extent to which they correspond to the classification provided by commercial antivirus software. More specifically: (1) the instruction sequence segment (n-gram) length sufficient to discriminate between programs from different families, and short enough to be present in variants of the same family, is identified; (2) different sequence similarity measures are compared to convert the n-gram match distribution of a pair of dynamic traces into a phylogenetic distance; and (3) analysis is performed as to whether removing contiguous repeats (looping behavior), which may be uninformative, influences the classification of the processed dynamic traces.

Identification of the instruction sequence segment length in the first step may require breaking the dynamic traces into smaller, uniformly sized pieces, or n-grams, of instructions and determining the most effective length(s) for n. The classification in the second step may include classifying unknown malicious programs according to the reference phylogeny. Unique identifier signatures may be identified, including n-grams extracted from the dynamic traces of the reference malware programs, and the identifier signatures may be assigned to the nodes of the phylogeny. A malicious program of interest can then be classified to the most specific node on the reference phylogeny consistent with the set of n-gram signatures it contains.

The classification may determine whether a new program is a variant of an existing family, a hybrid of two or more different malware programs, or constitutes a new malware strain. The performance of the classification approach may be evaluated by determining whether artificially generated malware variants are classified to the correct nodes of the reference phylogeny. The approach of some embodiments advances current state-of-the art malware classification methodologies by providing insight into the derivation relationships between different malicious programs and enabling rapid classification of unknown programs.

Reference Data Set

Malware executables were collected from malwr.com and CodeVision. CodeVision is a malware analysis system and repository developed by Los Alamos National Laboratory. CodeVision extracts the sequence of dynamic instruction traces generated by each malware sample as it is executed in a Cuckoo sandbox. As used herein, "dynamic trace", "instruction trace", and "dynamic instruction trace" all refer to information about a program's execution. Each malware sample was classified by four different commercial antivirus scanners (Symantec™, Microsoft™, Kaspersky™, and F-Secure™) run directly on CodeVision, as well as by its VirusTotal plugin. In order to generate a diverse and representative data set, at least three malware samples were chosen from ten different families. Because classification is frequently inconsistent between different antivirus (AV) vendors, only samples that were classified as belonging to the same family by at least two different AV scanners were included, resulting in 66 samples. Table 1 below gives the label derived from AV classifications and SHA1 hash of each malware sample analyzed herein.

TABLE 1

LABELS AND SHA1 HASHES FOR EACH MALWARE SAMPLE

| Malware Label: | SHA1 Hash: |
| --- | --- |
| Cryptolocker1 | 1c5a33d302a0aa399720a3fc27a51fdf168cedf1 |
| Cryptolocker2 | 4f8fee02a7fd2a8c4fa8e049945695608a622e7d |
| Cryptolocker3 | 504b5ffbb3095d721f8349fdf8908dab75ad7284 |
| Cryptolocker4 | 666a2df07687caf72e6890c09eae629ae2000f1a |
| Cryptolocker5 | 697dccafecff4e1c81386fd6f8f6b0eb37af8872 |
| Cryptolocker6 | 7bd1b593d1cb8fca7e0e1f393c6cb93c45f6498f |
| Cryptolocker7 | c29aa5a78bc1d0ee82e76ccb9a532988bddc030b |
| Cryptolocker8 | ca963033b9a285b8cd0044df38146a932c838071 |
| Teslacrypt1 | 32dc917c572b169cee62fc30577758750347a148 |
| Teslacrypt2 | e906fa3d51e86a61741b3499145a114e9bfb7c56 |
| Teslacrypt3 | 51b4ef5dc9d26b7a26e214cee90598631e2eaa67 |
| SpyEye1 | 430952b3c09de63f33e150e4f1146e4b8c3adf71 |
| SpyEye2 | 35698c61ad232ff90c5812372d23971118ea37cd |
| SpyEye3 | 171565913cf53864c0ba1ff9dc414ed6ac473662 |
| SpyEye4 | ecce2684f143b02fc187a4a6af22f1e9ed6c2c6f |
| SpyEye5 | 7cddef600cdae3890bbe2a2587e44de11bbc57bb |
| Sinowal1 | be4da77d8db6a3af7dedaa0dbe35a8bffdbf0062 |
| Sinowal2 | bb93a75bc14a8c2756c84c56eb1787ad92a36b48 |
| Sinowal3 | fa6673872297821c4e0bad0158a5317e1bbe6dac |
| Sinowal4 | 805c260ab8034114b4be3ab2d830ebaf688159bf |
| Upatre1 | 73f31429a77b21c48483b5292df1135ae78829d1 |
| Upatre2 | 9b109469080f130ae6f4feced61596c8ee9b3584 |
| Upatre3 | e205ad305fd76a0e328e57cb2c2cb08b3c934443 |
| Upatre4 | e2baf1925501683c1db6a4df4632063e2a29c081 |
| Upatre5 | fd131ce69c29e10268159f712473d9d8aef188e9 |
| Upatre6 | 8ed10137c8604c01413d973ff9cd353450cc9420 |
| Upatre7 | cf6a3e16341012100da77cc106afc13c4e8852ee |
| Upatre8 | 26eedbdde4e951103a06e8ab199ff70db69976a1 |

TABLE 1-continued

LABELS AND SHA1 HASHES FOR EACH MALWARE SAMPLE

| Malware Label: | SHA1 Hash: |
| --- | --- |
| Upatre9 | c72119c8c991c6880bb37fe880ec2ff7fd7ee99f |
| Upatre10 | 6221c2d91d272854b55eff28a5a85291a6b1e441 |
| Upatre11 | d338788eece074ce60b4a32a66910db156582412 |
| Upatre12 | d9f89d5846ca5bba0d99c713ccd8e5d50e3f5151 |
| Upatre13 | 34f8e41616109e9d40ef2d3203eccd769695eebd |
| Upatre14 | 6974d673bbf62e34f905e56724ffb70fbbb1b714 |
| Upatre15 | 6b5b2ede7fb0181e9edd3e8a29e9aac2395fc088 |
| Upatre16 | 3de47a5ed6331a007776dbe55ee964fd982e7359 |
| Upatre17 | b2ee6ebc6e86ec3bfdd52d25763bbde0100db8de |
| Upatre18 | ca93349f17137e7dae2d97fd236a568e16b510a3 |
| Upatre19 | 532aa3fac32de762bdb5f0a5e197a9f56bf8491b |
| Cabby1 | a8235971189382de94b228e9618667455e37999c |
| Cabby2 | b18d8fb58b62149e4e564f1738f04eff7fe2903e |
| Cabby3 | b54978814c27d7c04fd2e9cb296ea751142cf38b |
| Cabby4 | d8154d462b7b587aa5538ffd5abc5b78e2eb2409 |
| Cabby5 | f86f3b996ad0f08f49a8f2a13ca3b6173da45f32 |
| Cabby6 | 31db1e2ffac1c9aa3d4dbba92277f88ffe9b1068 |
| Cabby7 | 520673f93a21bab2832550a818b068e2c3775232 |
| Cabby8 | 5bef39decc36279f2f91aea983a1260571559e12 |
| DionisDuke1 | 6a3c2ad9919ad09ef6cdffc80940286814a0aa2c |
| DionisDuke2 | 317bde14307d8777d613280546f47ddOce54f95b |
| DionisDuke3 | 04299c0b549d4a46154e0a754dda2bc9e43dff76 |
| Sality1 | 917c51f4468279732da444e5844a0880f0c44254 |
| Sality2 | b7516967cf85a436b694c7823c8484bb1aad1c70 |
| Sality3 | e4f1548182e597e6d93e5a40da5721e07fcc0d4f |
| Sality4 | 8f07f9662cfefa1d867edaa0024cc1322ff19b48 |
| Sality5 | 36bf00a8697b562aafa7d48c4b79ff4060230f77 |
| Sality6 | e170c50310f1d9a311bcdf4a7158ec24b13bb209 |
| Allaple1 | 28a94a7a5393565b0f3127765717944b394cd957b |
| Allaple2 | d1ad146a65e184d03f291838b1c88836edaf0d25 |
| Allaple3 | 1bcff28c9b61c43780a417d6faf76208e31b692f |
| Allaple4 | 940b621a73c5efda23b3758e66d468a660cb8Odd |
| Allaple5 | 0e9f8ec453eb895bdb0aeff5ee5268b226f8ca3d |
| Bagle1 | 7443acc906aec352184241f3fef828acf64ca9be |
| Bagle2 | 71fb96f52a28c86f1a13513daacb072ad299d039 |
| Bagle3 | 6cb0462639659fb6932450625ef794c6376baf00 |
| Bagle4 | 51506fac559eb36dd62de9ecf50ecc7899e619af |
| Bagle5 | fe92fcdfe164b3bbb84928ad7ec4e6f1ce440ae8 |

Feature Extraction from Dynamic Traces

The analysis presented in this example is based on the abstracted disassemblies extracted from each dynamic trace. A disassembly 100 of an example dynamic trace is shown in FIG. 1A. Only the sequence of x86 instructions (middle column) is considered here, ignoring the address that each instruction acted on in memory. FIG. 1B shows trigram (3-gram) features 110 of this trace.

In some embodiments, n-grams are used as features to compare malware programs. The n-grams (i.e., contiguous subsequences of n instructions) may be extracted from malware instruction traces. Each instruction sequence may be divided into a set of n-grams by running a sliding window of length n along the sequence. FIG. 1B shows the set of 3-grams extracted from the sample dynamic trace.

The dynamic traces of the malware programs in this example consist of 136 different types of instructions. Graph 200 of FIG. 2 shows the relative frequencies at which the instructions occur. As can be seen, the distribution is long-tailed, with the five most frequent instruction types (mov, add, cmp, push, jnz) accounting for nearly 50% of all executed commands.

Next, a feature vector is constructed for each malware program, where the feature values correspond to the occurrence frequencies of each n-gram in the instruction trace. The feature vectors are stored in a character matrix in this embodiment, where each column corresponds to a different malware program, and each row to a different n-gram. Table 2A below shows the character matrix constructed from the number of times each 3-gram from FIG. 1B occurred in seven malware programs in the reference data set.

TABLE 2A

CHARACTER MATRIX WITH FREQUENCY COUNTS

|                | Blocker1 | Blocker2 | Upatre1 | Upatre2 | Upatre3 | Bagle1 | Bagle2 |
|---|---|---|---|---|---|---|---|
| push_mov_mov   | 7        | 8        | 506     | 4649    | 427     | 3965   | 4585   |
| mov_mov_xor    | 167244   | 18327    | 111     | 3       | 3       | 1494   | 6398   |
| mov_xor_cmp    | 50635    | 18327    | 7       | 3       | 6       | 1      | 2      |
| xor_cmp_sents  | 8771     | 6124     | 0       | 0       | 1       | 0      | 0      |
| cmp_sentz_dec  | 0        | 6104     | 0       | 0       | 0       | 0      | 0      |

A binary version of the character matrix was also generated, where the occurrence frequency is replaced by a value of 1 or 0, corresponding to the presence or absence of the n-gram in the instruction trace, respectively. The binary version of the sample character matrix of Table 2A is shown below in Table 2B.

TABLE 2B

BINARY CHARACTER MATRIX

|               | Blocker1 | Blocker2 | Upatre1 | Upatre2 | Upatre3 | Bagle1 | Bagle2 |
|---|---|---|---|---|---|---|---|
| push_mov_mov  | 1        | 1        | 1       | 1       | 1       | 1      | 1      |
| mov_mov_xor   | 1        | 1        | 1       | 1       | 1       | 1      | 1      |
| mov_xor_cmp   | 1        | 1        | 1       | 1       | 1       | 1      | 1      |
| xor_cmp_sentz | 1        | 1        | 0       | 0       | 1       | 0      | 0      |
| cmp_sentz_dec | 0        | 1        | 0       | 0       | 0       | 0      | 0      |

Choice of n-Gram Size

If the n-gram size is too small, random matches are expected to dominate. Accordingly, the way that the expected number of random matches varies with n-gram size is characterized. First, the relative frequency at which each instruction occurs in the set of instruction traces extracted from the malware corpus is calculated. The mean and maximum lengths of the instruction sequences are also determined. The expected number of n-grams matches in a pair of dynamic traces with arbitrary sequences of instructions is then calculated. If the probability of observing a specific instruction at a given position is equivalent to its relative frequency $f_j$, the expected number of matching n-grams in a pair of instruction traces of length L is $$\left(\sum_{j=1}^{N} f_j^2\right)^n L^2 \qquad (1)$$

where N is the number of instructions. The probability of a random n-gram match increases with the length of the instruction trace. Therefore, pairs of average and maximum length instruction traces are considered.

The expected number of random matches is also investigated as a function of n-gram size when the n-grams extracted from an instruction trace are reduced to a unique set (as for the binary character matrix). First, the average and maximum number of unique n-grams is determined in the reference malware programs for each n-gram size. Arbitrary unique n-gram sets are then constructed by sequentially generating n-grams one at a time and removing duplicates until a desired size is reached. Each n-gram is generated by sampling the set of instructions n times with replacement, where the probability of choosing a particular instruction is proportional to its relative frequency. The mean number of matching n-grams is calculated for 100 pairs of average and maximum-sized unique n-gram sets. The theoretical lower bounds of n-gram size are discussed further in the Results section below. This may be used to evaluate how well the approach of some embodiments classified the malware.

Preprocessing Dynamic Traces

Malware source code frequently contains loops and repeated function calls, resulting in repeated instruction sequences in the corresponding dynamic execution trace. This can dramatically increase the size of the execution trace, and thus the computational cost of feature extraction. Furthermore, similarity measures based on the relative frequency of n-grams extracted from dynamic traces may be strongly skewed by n-grams corresponding to repeating sections. The effect of preprocessing the dynamic instruction traces by removing all repeating subsequences of five or more contiguous instructions was investigated. After the removal of repeats, binary and occurrence frequency matrices were constructed from the feature vectors extracted from the preprocessed instruction traces as above. It was found that preprocessing improved malware phylogeny reconstruction using distance measures based on the occurrence frequency of n-grams.

The algorithm may include searching for subsequences consisting of k instructions, and incrementing k by 1 until the maximum repeat length of 500 commands is reached or the length of the dynamic trace is reduced to 2k−1. More specifically, the instruction sequence is divided into blocks of k instructions, starting from position j=0. If the sequence is not divisible by k, the remaining instructions are added back to the end of the sequence after the removal of repeats. Only the first instance of each contiguously repeating block is retained, and the remaining blocks are concatenated. The repeating block and the number of times it occurred is stored for subsequent analysis. The starting position is then incremented by 1, and the process repeated until all repeats of length k are removed, adding any instructions not included in the blocks back to the beginning and end of the processed sequences.

The preprocessing approach of some embodiments is demonstrated in Table 3 below. Consider a dynamic trace consisting of 26 instructions, where the longest repeat of length 11 appears twice, highlighted in bold and then bold and underlined: APAAMXDAAMXD<u>PAAMXDAAMXD</u>PMA. For conciseness, the instructions are represented by their capital letters, with A=add, P=push, M=mov, X=xor, and D=dec.

TABLE 3

PREPROCESSING EXAMPLE

Initialize k = 5 , L = 26; do while L > 2k − 1 & k < 500
Remove all repeats of length 5 (j in 1 to k − 1)

| | | | |
|---|---|---|---|
| j = 0 | L = 26 | APAAM, XDAAM, XDPAA, MXDAA, MXDPM | APAAMXDAAMXDPAAMXDAAM-XDPMA |
| j = 1 | L = 26 | PAAMX, DAAMX, DPAAM, XDAAM, XDPMA | APAAMXDAAMXDPAAMXDAAM-XDPMA |
| j = 2 | L = 26 | | APAAMXDPAAMXDAAMXDPMA |
| j = 3 | L = 21 | AMXDP, AAMXD, AAMXD | APAAMXDPAAMXDPMA |
| j = 4 | L = 16 | MXDPA, AMXDP | APAAMXDPAAMXDPMA |

All repeats of length 5 are removed increment k by 1

| | | | |
|---|---|---|---|
| j = 0 | L = 16 | APAAMX, DPAAMX PAAMXD, | APAAMXDPAAMXDPMA |
| j = 1 | L = 16 | PAAMXD | APAAMXDPMA |

L = 10 < 2k − 1: STOP

Figure 3:
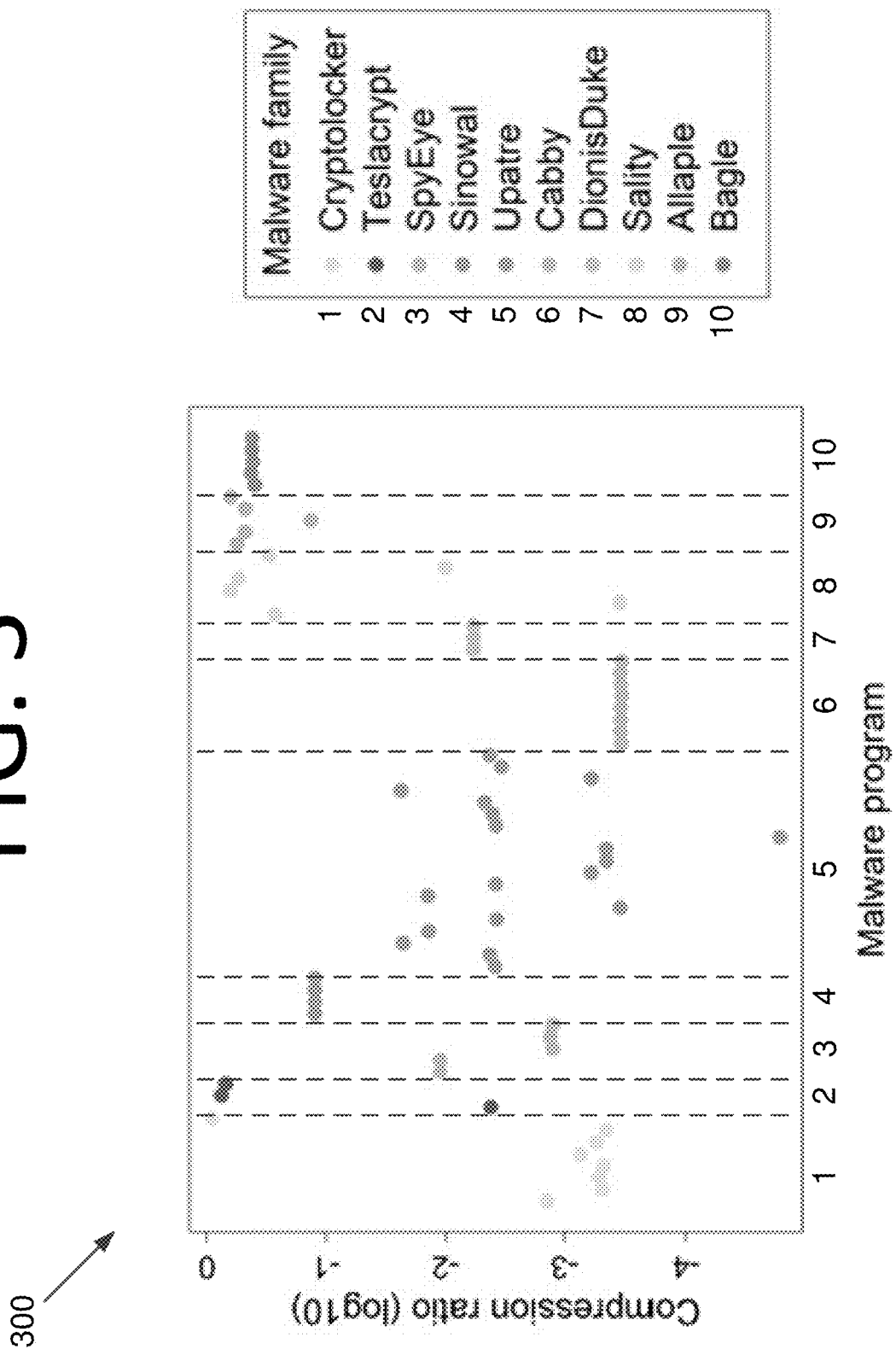
FIG. 3 is a graph illustrating the compression ratio for each malware program, according to an embodiment of the present invention.

Preprocessing is effective in reducing storage requirements of dynamic traces. Graph 300 of FIG. 3 shows the ratio between the lengths of the preprocessed and original dynamic traces, called the compression ratio, for each malware program. Due to the grayscale conversion, each program is enumerated with its group of dots separated by dashed lines for clarity. No obvious trend is apparent between the compression traces of malware variants belonging to different families. The degree of compression achieved by preprocessing varies up to 1000-fold between different variants of the Sality and Cryptolocker families, while variants of the DionisDuke, Cabby, Sinowal, and Bagle families have similar compression ratios.

Figure 4:
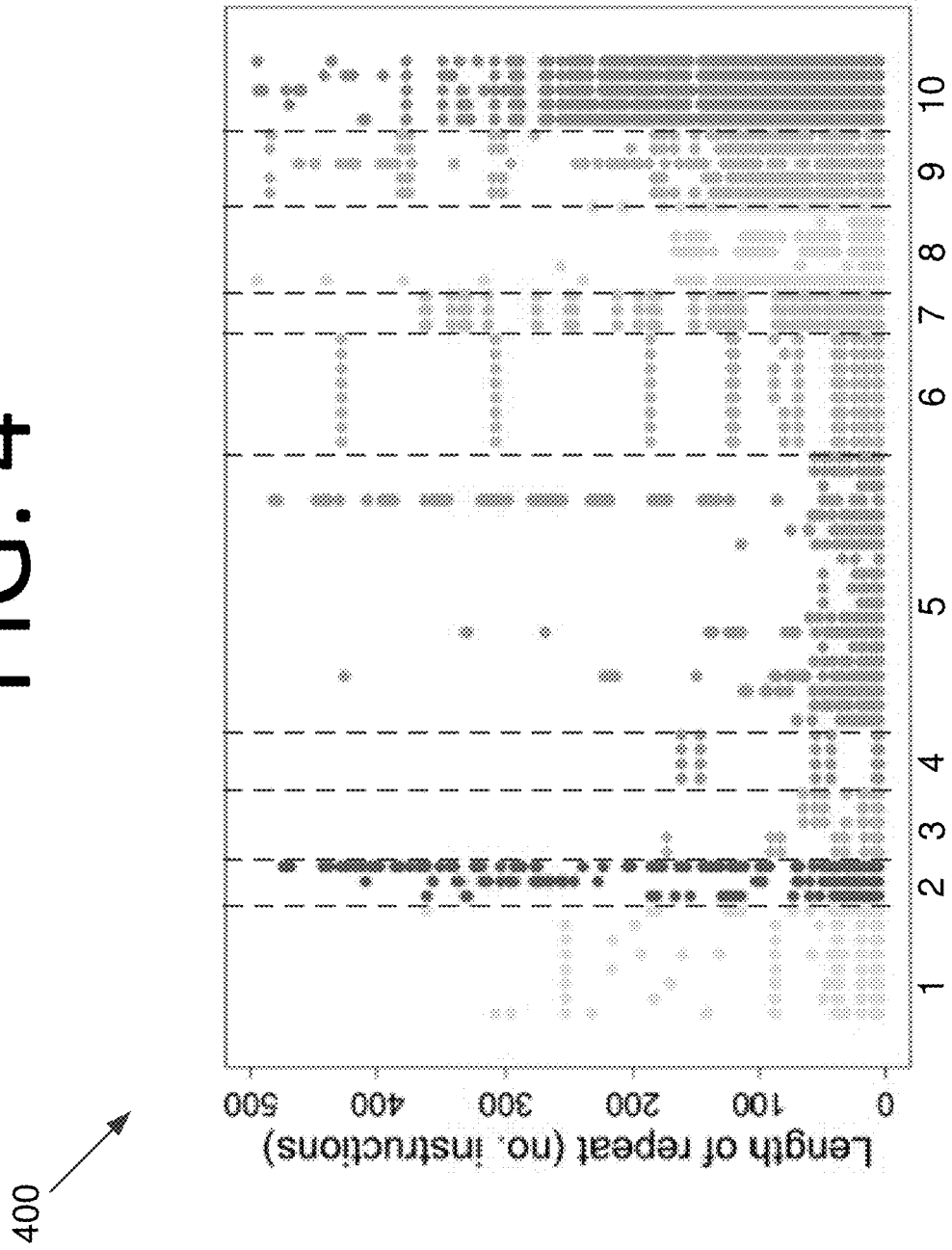
FIG. 4 is a graph illustrating the distribution of repeat lengths extracted from each dynamic trace for each malware program, according to an embodiment of the present invention.

Interestingly, the distribution of repeat lengths extracted from each dynamic trace is similar for malware variants belonging to the same family, as seen in graph 400 of FIG. 4. As with FIG. 3, each program is enumerated with its group of dots separated by dashed lines for clarity, and the same reference numerals are used for each malware program as in FIG. 3. This suggests that related malware programs may share repeating subsequences, corresponding to an identical loop in the source code. However, the number of times that the repeats occur (i.e., the loop is executed) is highly variable.

Generation of Phylogenetic Trees

In this section, a process for reconstructing the evolutionary history of malware programs based on the similarity of their instruction traces is described. This involves determining the phylogenetic distance between each pair of malicious programs, and using the resulting distance matrix to build a neighbor-joining phylogenetic tree in some embodiments. For more information on the neighbor joining method, see Naruya Saitou and Masatoshi Nei, "*The Neighbor-Joining Method: A New Method for Reconstructing Phylogenetic Trees*," Mol. Biol. Evol. 4(4): 406-425 (1987). The distance matrix is constructed by comparing the n-gram feature vectors extracted from the instruction traces for each pair of malicious programs. The extent to which phylogenies generated by different distance functions and n-gram sizes from original and preprocessed instruction traces correspond to the classification produced by AV software is then evaluated.

Constructing a Phylogenetic Distance Matrix

Four different distance functions are used in some embodiments to calculate the phylogenetic distance between each pair of instruction traces by comparing their feature vectors. The distance functions take as input either a binary or an occurrence frequency character matrix, and generate a symmetric pairwise distance matrix as output.

Binary Proportional (BP)

The simplest measure of sequence similarity between a pair of instruction traces is likely the proportion of n-grams they share. The BP distance between instruction traces j and k is defined as:

$$d_{BP}(j, k) = \frac{\sum_{i=1}^{m} |\hat{c}_{ij} - \hat{c}_{ik}|}{\sum_{i=1}^{m} \hat{c}_{ij} + \sum_{i=1}^{m} \hat{c}_{ik}} \quad (2)$$

where $\hat{c}$ is a binary character matrix and m is the number of rows of $\hat{c}$, constituting different n-grams. According to this measure, two programs are identical ($d_{BP}=0$) if they have the same set of n-grams, even if the number of times each n-gram occurs differs between the traces.

Binary Proportional—Inverse Document Frequency (BP-IDF)

Here, the importance of n-grams that are common to mant programs is weighted using IDF scaling. The IDF scaling of n-gram i is defined as:

$$w_i = 1 + \log\left(\frac{N}{F_i}\right) \quad (3)$$

where N is the number of malicious programs and $F_i$ is the fraction of programs that n-gram i occurs in. Each row of the binary character matrix is multiplied by its IDF scaling, and the BP distance function above is applied to the transformation matrix:

$$d_{BP-IDF}(j, k) = \frac{\sum_{i=1}^{m} w_i |(\hat{c}_{ij} - \hat{c}_{ik})|}{\sum_{i=1}^{m} w_i \hat{c}_{ij} + \sum_{i=1}^{m} w_i \hat{c}_{ik}} \quad (4)$$

Binary Cosine Similarity—Inverse Document Frequency (BCS-IDF)

The cosine similarity measure, which compares the spatial orientation of two feature vectors, is used frequently in information retrieval applications. The cosine similarity is applied to the columns of the IDF scaled binary character matrix. The BCS-IDF distance between instruction traces j and k is defined as:

$$d_{BCS-IDF}(j, k) = 1 - \frac{\sum_{i=1}^{m} (w_i \hat{c}_{ij})(w_i \hat{c}_{ik})}{\sqrt{\sum_{i=1}^{m} (w_i \hat{c}_{ij})^2} + \sqrt{\sum_{i=1}^{m} (w_i \hat{c}_{ij})^2}} \quad (5)$$

Term Frequency Cosine Similarity—Inverse Document Frequency (TFCS-IDF)

Here, the occurrence frequency of each n-gram is incorporated into the BCS-IDF distance function. First, the columns of the occurrence frequency character matrix are normalized such that the entries correspond to the relative frequency of each n-gram in the instruction trace. Then, the BCS-IDF distance function is applied to the normalized occurrence frequency character matrix.

The phylogenetic distance matrices constructed from the four distance measures are shown in Tables 4A-D below.

TABLE 4A

PAIRWISE DISTANCE MATRIX GENERATED BY THE BP DISTANCE FUNCTION

|  | Blocker1 | Blocker2 | Upatre1 | Upatre2 | Upatre3 | Bagle1 | Bagle2 |
| --- | --- | --- | --- | --- | --- | --- | --- |
| Blocker1 | 0 | 0.11 | 0.14 | 0.14 | 0 | 0.14 | 0.14 |
| Blocker2 | 0.11 | 0 | 0.25 | 0.25 | 0.11 | 0.25 | 0.25 |
| Upatre1 | 0.14 | 0.25 | 0 | 0 | 0.14 | 0 | 0 |
| Upatre2 | 0.11 | 0.25 | 0 | 0 | 0.14 | 0 | 0 |
| Upatre3 | 0 | 0.11 | 0.14 | 0.14 | 0 | 0.14 | 0.14 |
| Bagle1 | 0.14 | 0.25 | 0 | 0 | 0.14 | 0 | 0 |
| Bagle2 | 0.14 | 0.25 | 0 | 0 | 0.14 | 0 | 0 |

TABLE 4B

PAIRWISE DISTANCE MATRIX GENERATED BY THE BP-IDF DISTANCE FUNCTION

|  | Blocker1 | Blocker2 | Upatre1 | Upatre2 | Upatre3 | Bagle1 | Bagle2 |
| --- | --- | --- | --- | --- | --- | --- | --- |
| Blocker1 | 0 | 0.23 | 0.24 | 0.24 | 0 | 0.24 | 0.24 |
| Blocker2 | 0.23 | 0 | 0.44 | 0.44 | 0.23 | 0.44 | 0.44 |
| Upatre1 | 0.24 | 0.44 | 0 | 0 | 0.24 | 0 | 0 |
| Upatre2 | 0.24 | 0.44 | 0 | 0 | 0.24 | 0 | 0 |
| Upatre3 | 0 | 0.23 | 0.24 | 0.24 | 0 | 0.24 | 0.24 |
| Bagle1 | 0.24 | 0.44 | 0 | 0 | 0.24 | 0 | 0 |
| Bagle2 | 0.24 | 0.44 | 0 | 0 | 0.24 | 0 | 0 |

TABLE 4C

PAIRWISE DISTANCE MATRIX GENERATED BY THE BCS-IDF DISTANCE FUNCTION

|  | Blocker1 | Blocker2 | Upatre1 | Upatre2 | Upatre3 | Bagle1 | Bagle2 |
| --- | --- | --- | --- | --- | --- | --- | --- |
| Blocker1 | 0 | 0.35 | 0.32 | 0.32 | 0 | 0.32 | 0.32 |
| Blocker2 | 0.35 | 0 | 0.55 | 0.55 | 0.35 | 0.55 | 0.55 |
| Upatre1 | 0.32 | 0.55 | 0 | 0 | 0.32 | 0 | 0 |
| Upatre2 | 0.32 | 0.55 | 0 | 0 | 0.32 | 0 | 0 |
| Upatre3 | 0 | 0.35 | 0.32 | 0.32 | 0 | 0.24 | 0.24 |
| Bagle1 | 0.32 | 0.55 | 0 | 0 | 0.32 | 0 | 0 |
| Bagle2 | 0.32 | 0.55 | 0 | 0 | 0.32 | 0 | 0 |

TABLE 4D

PAIRWISE DISTANCE MATRIX GENERATED BY THE TFCS-IDF DISTANCE FUNCTION

|  | Blocker1 | Blocker2 | Upatre1 | Upatre2 | Upatre3 | Bagle1 | Bagle2 |
| --- | --- | --- | --- | --- | --- | --- | --- |
| Blocker1 | 0 | 0.29 | 0.79 | 1 | 0.99 | 0.66 | 0.23 |
| Blocker2 | 0.29 | 0 | 0.88 | 1 | 0.99 | 0.81 | 0.56 |
| Upatre1 | 0.79 | 0.88 | 0 | 0.02 | 0.02 | 0.01 | 0.26 |
| Upatre2 | 1 | 1 | 0.02 | 0 | 0 | 0.06 | 0.41 |
| Upatre3 | 0.99 | 0.99 | 0.02 | 0 | 0 | 0.06 | 0.41 |
| Bagle1 | 0.66 | 0.81 | 0.01 | 0.06 | 0.06 | 0 | 0.17 |
| Bagle2 | 0.23 | 0.56 | 0.26 | 0.42 | 0.41 | 0.17 | 0 |

The applicability of the different phylogenetic distance matrices for comparing malware is discussed in the Results section below.

Reconstructing Phylogenetic Trees

Figure 5:
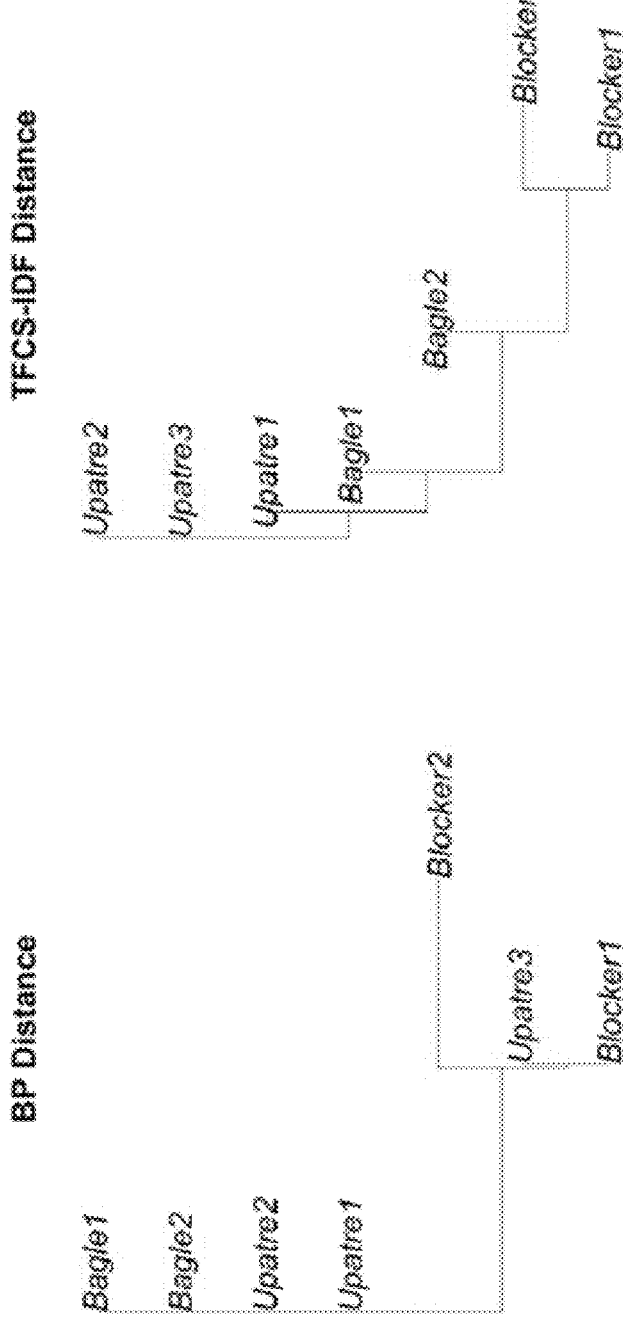
FIG. 5 illustrates NJ-trees generated from the BP and TFCD-IDF distance matrices from Tables 4A and 4D, according to an embodiment of the present invention.

Once a pairwise distance matrix has been constructed from malware instruction traces, a phylogenetic tree can be generated that reflects the ancestral relationships between the programs. In some embodiments, phylogenetic trees using the neighbor-joining (NJ) algorithm using the Analysis of Phylogenetics and Evolution (APE) package in R. FIG. 5 shows NJ-trees 500 generated from the BP and TFCS-IDF distance matrices from Tables 4A and 4D. More specifically, sample NJ-phylogenies generated from the sample trigram sets using the BP distance measure are shown on the left and using the TFCS-IDF distance measure is shown on the right.

Considering separately the original and preprocessed instruction sequences, a set of phylogenies was generated for each distance measure by varying the n-gram size between 2 and 50. To summarize each collection of phylogenies, consensus trees were constructed using the APE package in R. The majority-rule algorithm was used, which resolves conflicting branching patterns among a set of trees by selecting the pattern seen in more than 50% of trees.

Evaluating Classification of Phylogenetic Trees

A new metric is proposed to evaluate how well different malware phylogenies correspond to the classification provided by commercial antivirus software: the fraction of malware programs that belong to the largest monophyletic group for each malware family. A monophyletic group consists of a collection of malware variants of the same family that descend from a single common ancestor. The two Blocker variants form a monophyletic group in the TFCS-IDF distance-based phylogeny in FIG. 5.

To find the largest monophyletic group for each malware family, the set of descendants for each internal node in the phylogeny was determined. Then, which internal nodes define a monophyletic group was identified (i.e., all of their descendants belong to the same malware family). The fraction of programs included in the largest monophyletic group of each malware family was then determined.

Signature-Based Classification of Unknown Malware Programs

Figure 6:
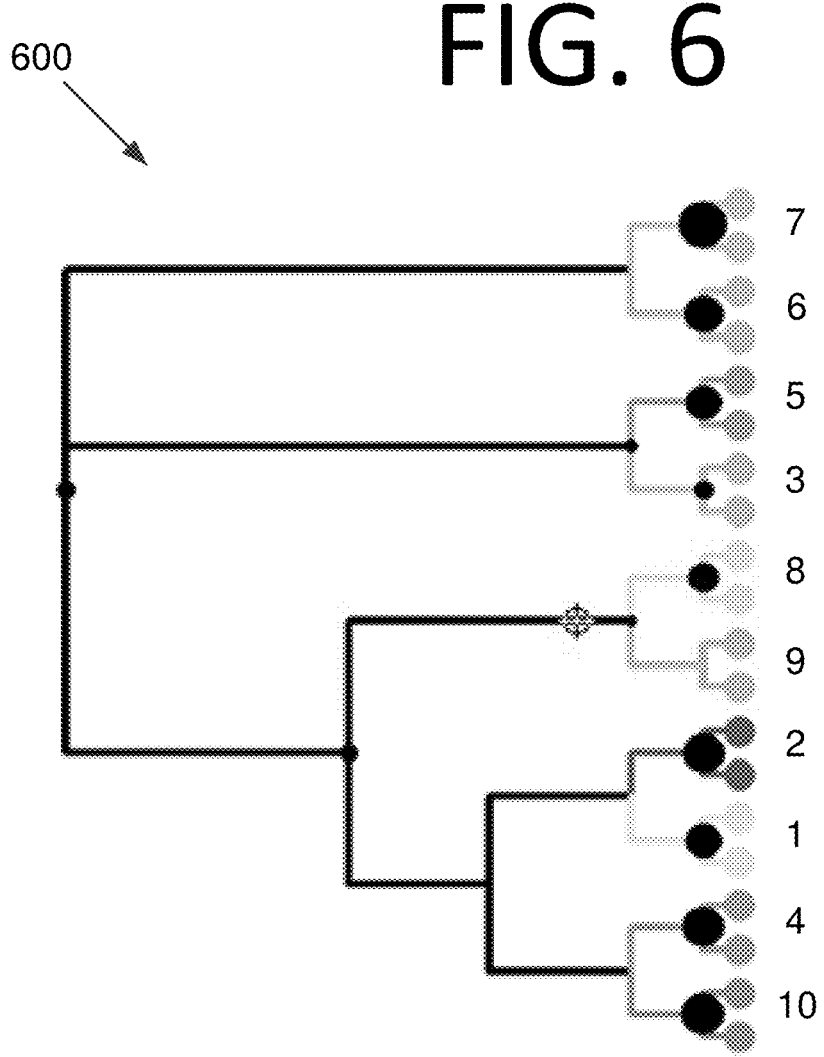
FIG. 6 is a tree illustrating the assignment of signatures to the reference phylogeny, according to an embodiment of the present invention.

The approach developed by Berendzen et al. was used to rapidly classify shotgun metagenomics data against a reference phylogeny. See Berendzen et al., *Rapid Phylogenetic and Functional Classification of Short Genomic Fragments with Signature Peptides*, BMC Research Notes 2012, 5:460 http://www.biomedcentral.com/1756-0500/5/460 (2012). In the Berendzen et al. approach, n-gram signatures extracted from the reference organisms are assigned to the internal nodes of the reference phylogeny, and unknown organisms are classified to the nodes according to the signatures they contain. These steps are described in detail below. The assignment of signatures to the reference phylogeny is depicted in tree 600 of FIG. 6, and the classification of unknown malware programs is depicted in tree 700 of FIG. 7. More specifically, for FIG. 6, the example reference phylogeny was constructed from two randomly chosen variants from each malware family by applying the binary proportional distance function to a character matrix constructed from 10-grams. The size of the black circle at each internal node corresponds to the number of 20-gram signatures assigned to it (log 10 scale). For FIG. 7, the example demonstrates the classification of a variant from the Spyeye (triangles and square in the top half) and Sinowal (triangles and square in the bottom half) families according to signatures assigned to the nodes of the reference phylogeny. The squares represent the nodes that each variant is classified to.

Assigning Signatures to the Nodes of the Reference Phylogeny

The signature assignment process of some embodiments is as follows: (1) extract features of interest (i.e., n-grams of a given length) from the instruction sequence of each reference malware program; (2) build a binary character matrix as in Table 2B from all signatures that are shared by at least two malware programs; (3) find the set of descendant leaves for each internal node on the phylogeny; and (4) assign each signature to the internal node that is the lowest common ancestor of all leaves that contain it (i.e., the deepest node on the phylogeny from which all programs that contain the signature descend). It should be noted that the node may also have descendants that do not share the signature.

Classifying an Unknown Program to a Node on the Reference Phylogeny

The classification process of some embodiments is as follows: (1) extract the set of all signatures from the instruction trace of the unknown malware specimen (n-grams of the same length as on the reference phylogeny); and (2) match the signatures of the unknown malware program against the signatures on the reference phylogeny, and identify the set of internal nodes that they belong to. If there are no signature matches, the malware sample is classified to the root of the tree, and considered a potentially novel malicious program. If the set of signature-containing nodes is a subset of the internal nodes along a single path from the leaf to the root of the tree, i.e. forms a monophyletic lineage, the unknown malware program is classified to the node that is farthest from the root. It is considered a variant of the malware programs that are descendants of the node that it is classified to. If the set of signature-containing nodes are associated to multiple lineages, the program is classified to the lowest common ancestor of the nodes that are farthest from the root. It is considered a potentially novel hybrid of the different malware programs that descend from the deepest signature-containing nodes. Whenever novel malware programs are discovered, the reference phylogeny should be updated to reflect this increased diversity. Every time a new reference is added to the phylogeny, the signatures at the internal nodes should be reassigned.

Figure 7:
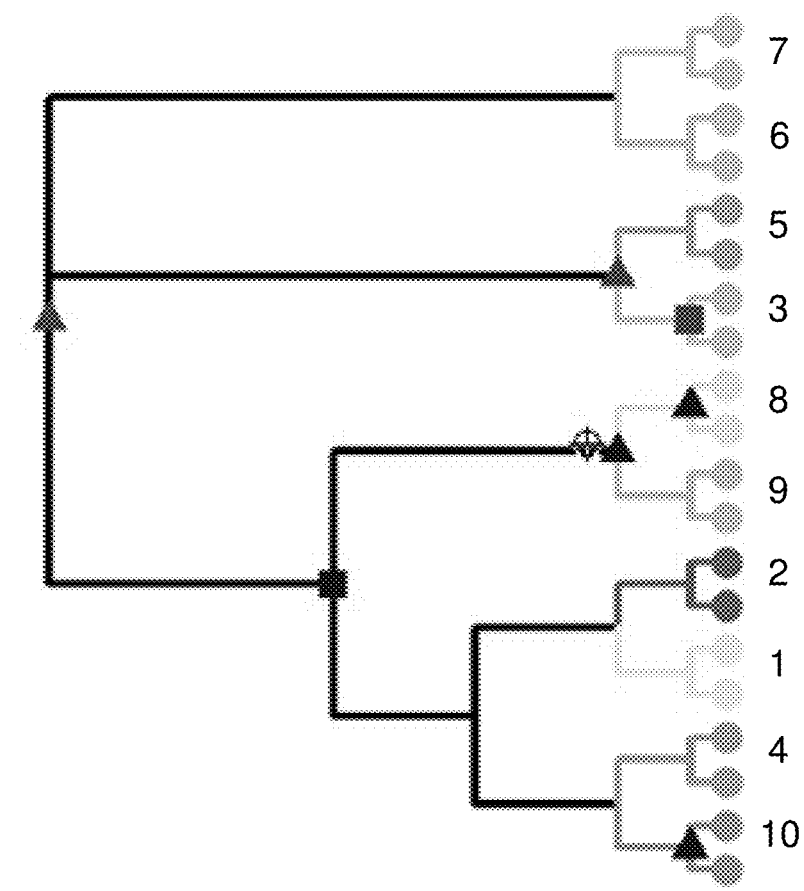
FIG. 7 is a tree illustrating the classification of unknown malware programs, according to an embodiment of the present invention.

FIG. 7 depicts the classification of a malware variant from the SpyEye and Sality families. The signatures associated with the SpyEye variant form a monophyletic lineage (symbols in the top half), so the variant is classified to the deepest internal node on the path (square in top half), and is correctly considered to belong to the SpyEye family. The signatures associated with the Sality variant (symbols in the bottom half) belong to lineages from the Bagle and Sality families. The variant is classified to the lowest common ancestor (square in lower half), and is considered a hybrid of the Sality and Bagle families.

Generating Artificially Mutated Variants of Reference Malware Programs

The robustness of the classification approach of some embodiments was tested and evaluated by generating artificially mutated variants of the malware reference programs, and determining whether they are classified to the correct families. The mutation process involves randomly replacing instructions in the set of n-grams extracted from the instruction trace of a malware program. The replacement is drawn randomly from the set of all instructions observed in the instruction traces of the reference malware programs, with probability proportional to the relative occurrence frequency of each instruction. 100 mutated variants of the n-gram sets of each reference program were generated, varying the mutation probability of each instruction from $\mu$=0.01 to $\mu$=0.50. Table 5 shows what a mutated n-gram set might look like for the Blocker2 variant introduced in FIGS. 1A and 1B.

TABLE 5

MUTATED TRIGRAM SET FOR BLOCKER2 MALWARE PROGRAM

| Blocker2: | Blocker2 Variant: |
|---|---|
| push_mov_mov | push_xor_mov |
| mov_mov_xor | mov_mov_xor |
| mov_xor_cmp | mov_xor_cmp |
| xor_cmp_sentz | xor_cmp_mov |
| cmp_sentz_dec | cmp_sentz_dec |

Sequentially Generating Reference and Testing Sets from Malware Corpus

In the previous section, artificial variants of the reference malware programs were generated using a simulated mutation process consisting of random one-to-one substitution of instructions. In contrast to the random mutation process underlying biological evolution, the generation of new malware variants involves making intentional modifications to the source code. The extent to which the simulated mutation process captures the evolution of malware variants in the wild is unknown. Therefore, the robustness of the classification approach is evaluated using real malware dynamic traces in addition to the artificially generated data set.

The malware corpus was randomly divided into a reference set and a testing set, and the testing set was classified against a reference phylogeny constructed from the training set as follows: (1) randomly choose two variants from each malware family to form the initial reference set—the remaining malware programs form the testing set; and (2) while there is at least one malware program in the testing set: (a) generate a phylogeny from the reference malware set, and assign signature n-grams to its nodes; (b) classify the malware programs in the testing set to the nodes of the reference phylogeny; and (c) randomly choose one variant from each malware family in the testing set, and add into the reference set. It was investigated how large and representative the reference phylogeny should be for accurate classification of malware variants (i.e., how many programs from each family should be included in the reference tree such that the remaining programs are classified as variants of that family).

Results

Theoretical Minimum n-Gram Size

The choice of n-gram size is of fundamental importance in the analysis for some embodiments. If the n-grams are too short, matches may be found between unrelated programs due to random chance, while n-grams that are too long may not find matches between even highly related programs. The theoretical minimum n-gram size at which finding a random match between a pair of instruction traces is unlikely was first determined.

Figure 8:
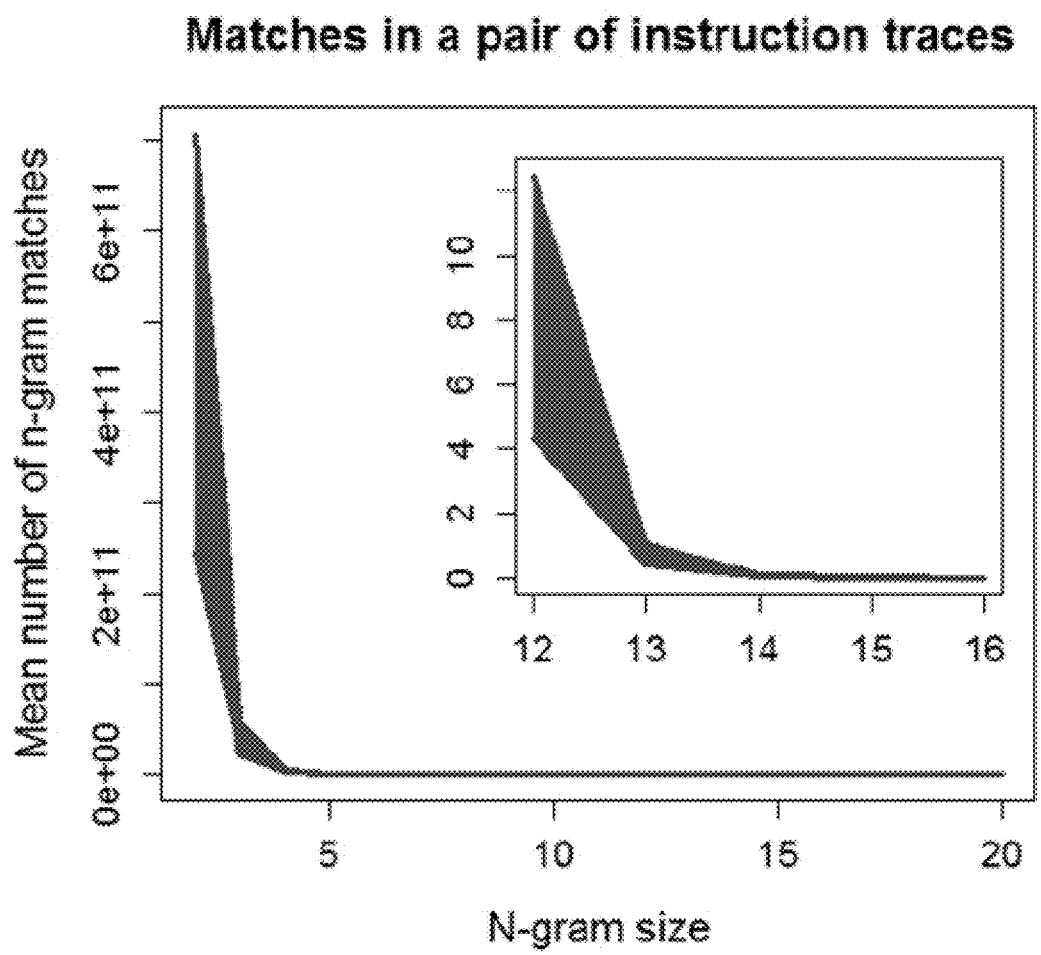
FIG. 8 is a graph illustrating the effect of n-gram size on the expected number of n-gram matches between a pair of randomly generated instruction traces of a given length, according to an embodiment of the present invention.

Graph 800 of FIG. 8 shows the effect of n-gram size on the expected number of n-gram matches between a pair of randomly generated instruction traces of a given length. The upper (lower) boundary of the envelope corresponds to instruction traces of maximal (average) length. The lower boundary of the envelope corresponds to average length instruction traces (5,884,637 instructions), and the upper boundary to traces of maximum length (10,000,008). The number of random n-gram matches decreases exponentially with n-gram size. When the n-gram size is 13 or higher, less than one random match in a pair of average length instruction traces is expected. These results suggest that when using distance functions based on n-gram occurrence frequency, the n-gram length should be at least 13 to avoid false matches.

Figure 9:
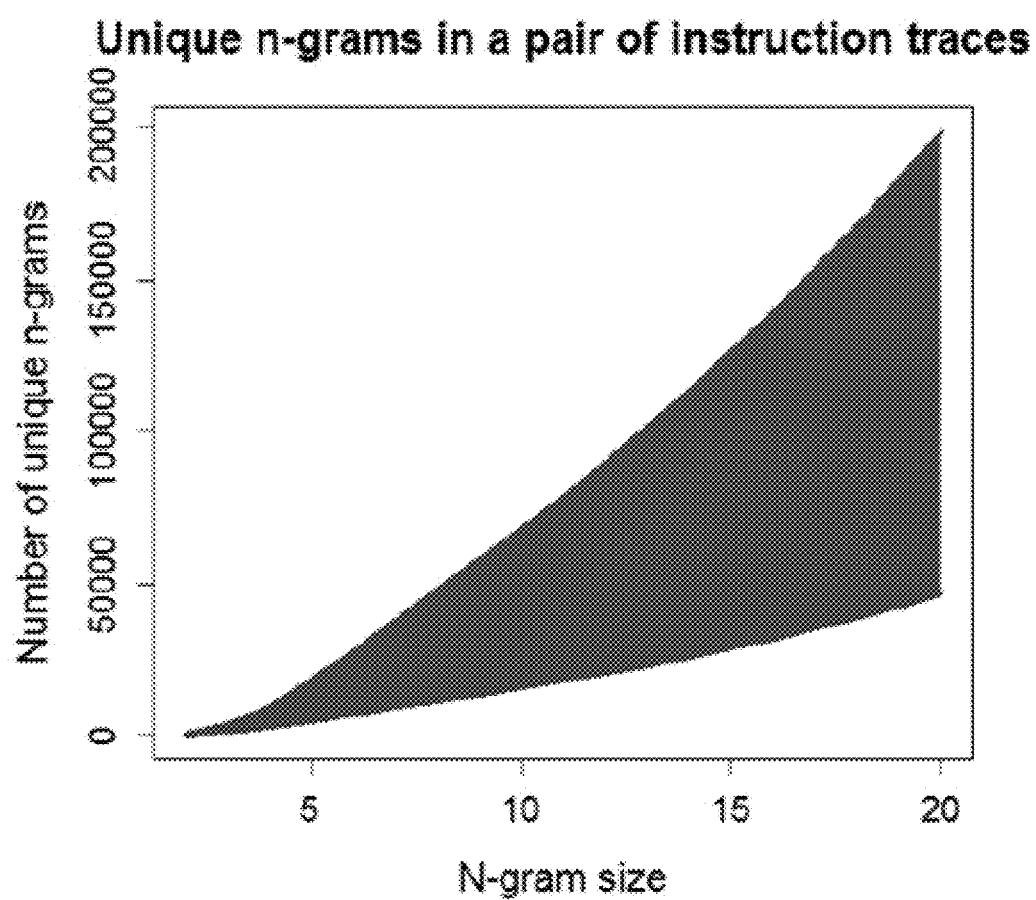
FIG. 9 is a graph illustrating the number of unique n-grams extracted from the instruction traces of the reference malware programs as a function of n-gram size, according to an embodiment of the present invention.

Several distance measures were considered based on the presence or absence of specific n-grams. Therefore, the effect of n-gram size on the expected number of random matches between pairs of unique n-gram sets was also investigated. Graph 900 of FIG. 9 shows the number of unique n-grams extracted from the instruction traces of the reference malware programs as a function of n-gram size. The upper (lower) boundary of the envelope corresponds to the maximum (average) number of unique n-grams. Interestingly, the average number of unique n-grams (lower boundary of the envelope) grows at a much slower rate than the maximum (upper boundary).

Figure 10:
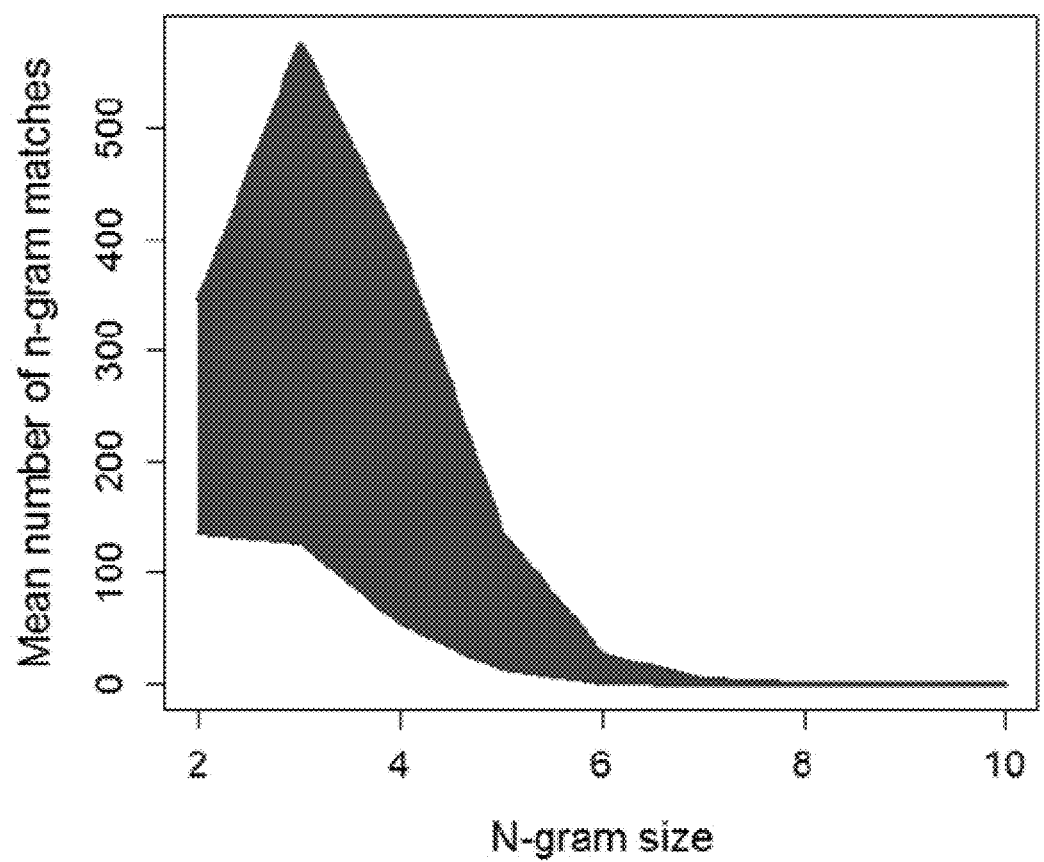
FIG. 10 is a graph illustrating the mean number of random matches in 100 pairs of unique n-gram sets as a function of n-gram size, according to an embodiment of the present invention.

Graph 1000 of FIG. 10 shows the mean number of random matches in 100 pairs of unique n-gram sets as a function of n-gram size. The lower boundary of the envelope corresponds to n-gram sets of average size, and the upper boundary to maximal n-gram sets. These results suggest that malware programs with instruction traces containing an average number of unique n-grams can be distinguished from each other when the n-gram size is greater than or equal to six. Pairs of malware with the most diverse instruction traces are expected to have less than one random match when the n-gram size is eight or higher.

Consensus Trees for Different Distance Measures

It was investigated how using different distance measures affected the topology of the reconstructed phylogenies. The phylogenies generated by different distance measures from original and preprocessed (per the above) instruction traces were compared. A 90% consensus tree was constructed to summarize each set of phylogenies generated by varying the n-gram size. It was found that consensus trees constructed from unprocessed and preprocessed instruction traces were nearly identical for each distance measure.

Figure 11:
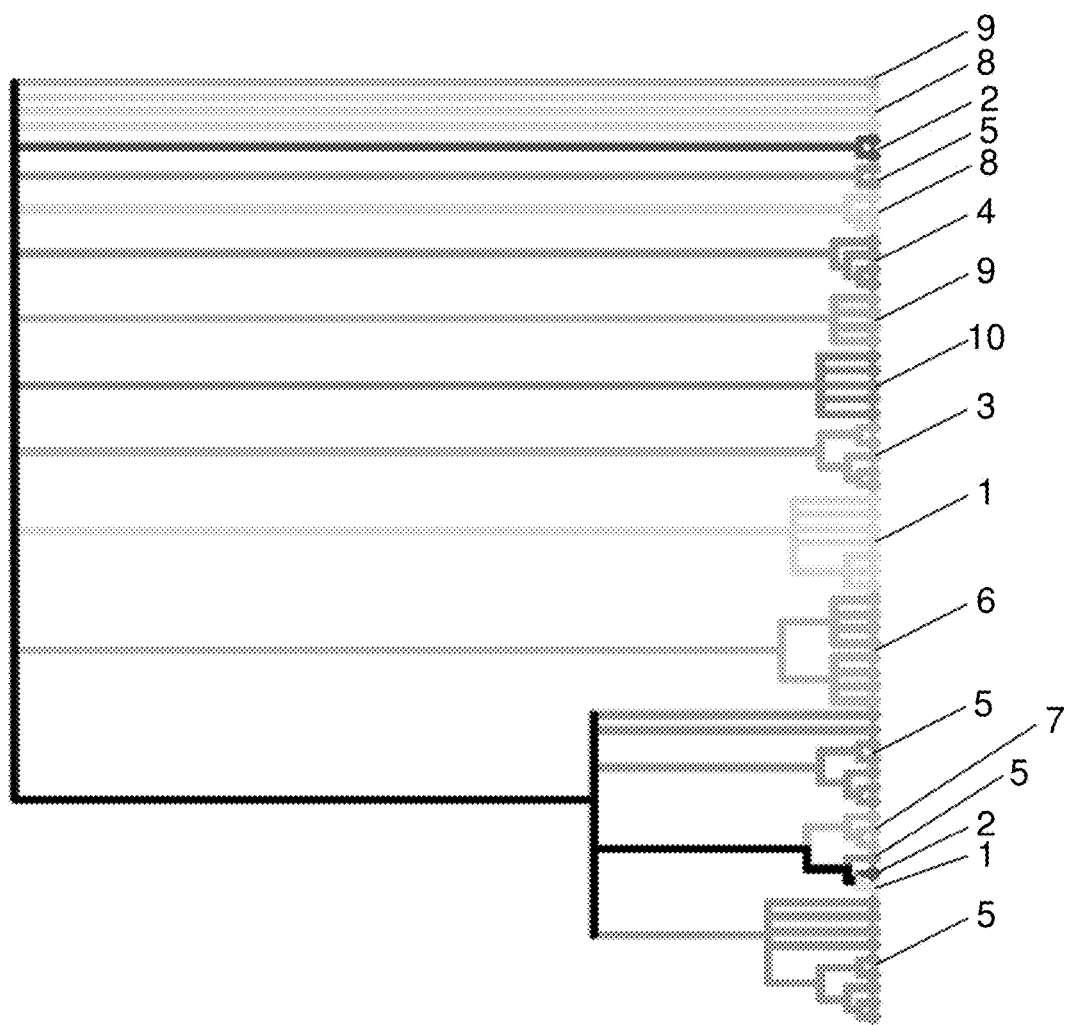
FIG. 11 is a graph illustrating the 90% consensus tree corresponding to the Binary Proportion (BP) distance measure, according to an embodiment of the present invention.

Consensus trees generated using the three different binary distance measures (Eq. (2), (4), and (5)) were also very similar to each other, and more in line with the AV classification than trees generated using the TFCS-IDF measure. Graph 1100 of FIG. 11 shows the 90% consensus tree corresponding to the Binary Proportion (BP) distance measure. The numbers 1 to 10 are the same malware designations as used in FIGS. 6 and 7, for example. The consensus summarizes the set of trees generated from unprocessed instruction traces for n-gram sizes between 2 and 50.

All variants from the Sinowal, Bagle, Spyeye, Cabby, and DionisDuke families form monophyletic groups, whereas variants from the Sality and Allaple families do not. Variants of the Upatre downloader family cluster into two groups. The larger group also includes the DionisDuke family and a variant from the Cryptolocker and Teslacrypt families.

Figure 12:
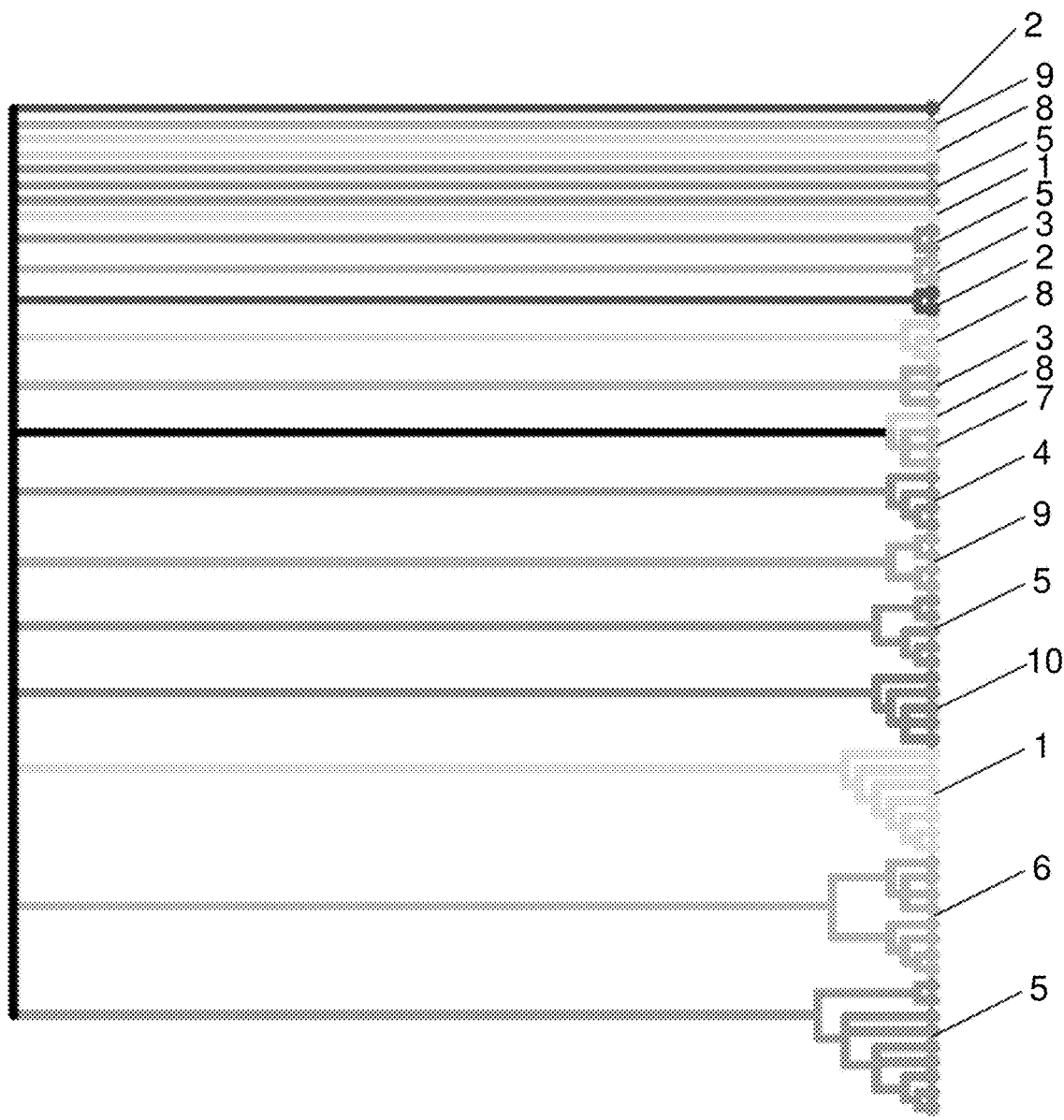
FIG. 12 is a graph illustrating the 90% consensus of the set of phylogenies generated by the TFCS-IDF distance measure from unprocessed instruction traces, according to an embodiment of the present invention.

Graph 1200 of FIG. 12 shows the 90% consensus of the set of phylogenies generated by the TFCS-IDF distance measure from unprocessed instruction traces. The TFCS-IDF distance does not capture similarities between malware variants of the same type to the same extent as the binary distance measures: the SpyEye family splits into two, and the Upatre family into six clusters. This suggests that distances bases on the presence or absence of n-grams are more applicable for comparing malware instruction sequences than distances based on the occurrence frequencies of n-grams.

Optimal n-Gram Size for Each Distance Measure

The optimal n-gram size for each distance measure was identified based on the mean proportion of malware programs that do not cluster into monophyletic groups (i.e., non-monophyletic variants). Unprocessed and preprocessed traces were considered separately. The lower the proportion of non-monophyletic variants, the more consistent the phylogeny is with the AV classification.

Figure 13:
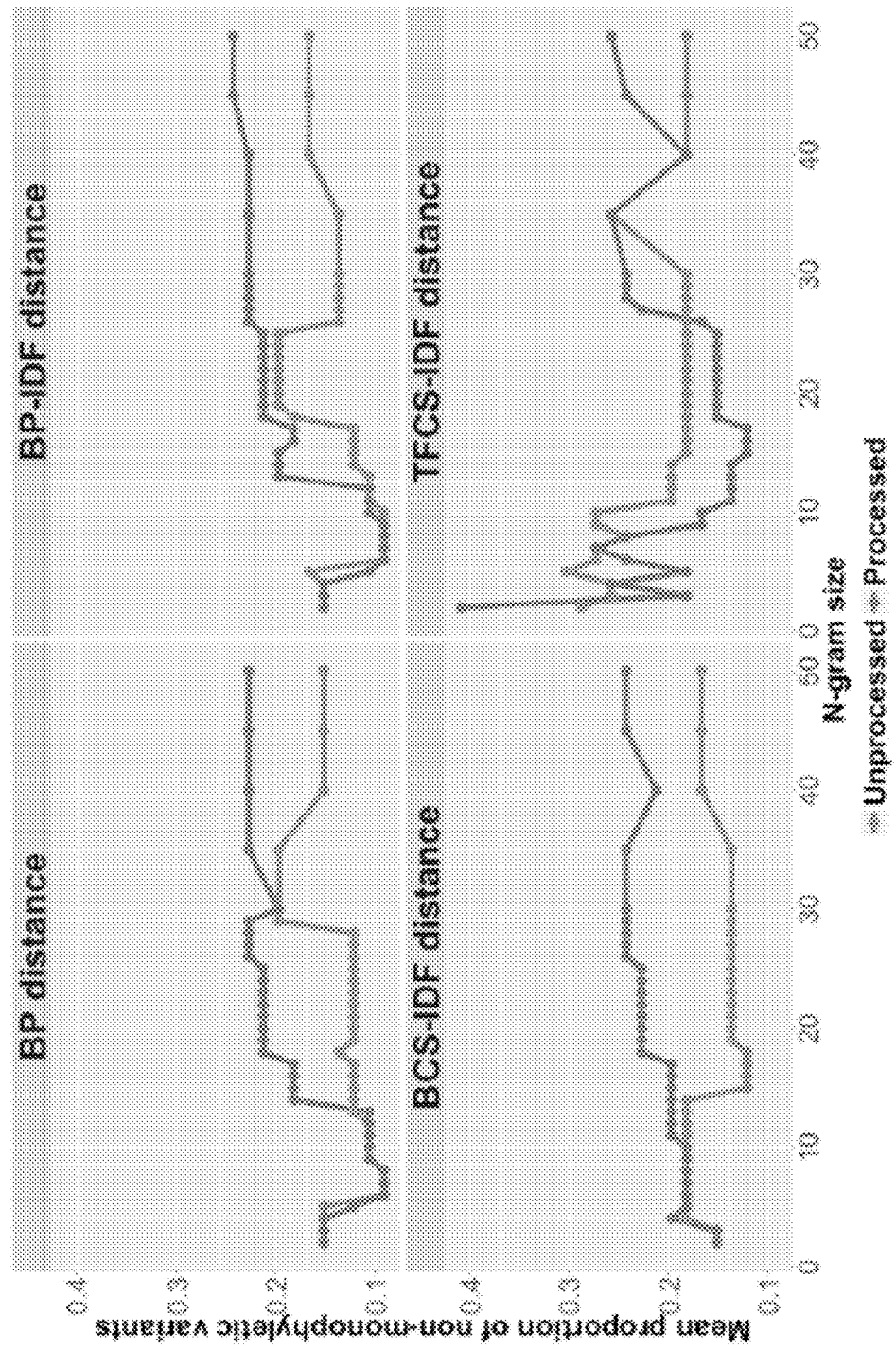
FIG. 13 includes graphs illustrating the proportion of malware programs that do not cluster into monophyletic groups as a function of n-gram size for the BP, BP-IDF, BCS-IDF, and TFCS-IDF distance measures, according to an embodiment of the present invention.

Graphs 1300 of FIG. 13 show the proportion of malware programs that do not cluster into monophyletic groups as a function of n-gram size for the BP, BP-IDF, BCS-IDF, and TFCS-IDF distance measures. The lighter (mostly bottom) lines correspond to preprocessed (original) instruction traces. The smaller the proportion of nonmonophyletic variants, the better the classification.

The optimal n-gram length for these distance measures is between six and ten, corresponding with the theoretical minimum n-gram size of eight that was found earlier. For this n-gram range, preprocessing the instruction traces does not affect the classification, but as n-gram size increases, using the original instruction sequences produces a better classification. Interestingly, preprocessing the instruction traces improves the classification for the TFCS-IDF distance. The ideal n-gram length is between 15 to 30 for unprocessed traces and between 15 and 17 for preprocessed traces for this distance measure. The minimum n-gram length is again close to the theoretical estimate of 14.

Effect of n-Gram Size on Phylogenetic Distance

So far, only the tree topology has been used to classify malware variants, ignoring phylogenetic distance. For each malware family, the ratio between the mean within-family distance (between each pair of variants in the family) and the mean between-family distance (between each variant in the family and outside the family) was also determined. The smaller the ratio, the closer the variants in the family are to each other.

Figure 14:
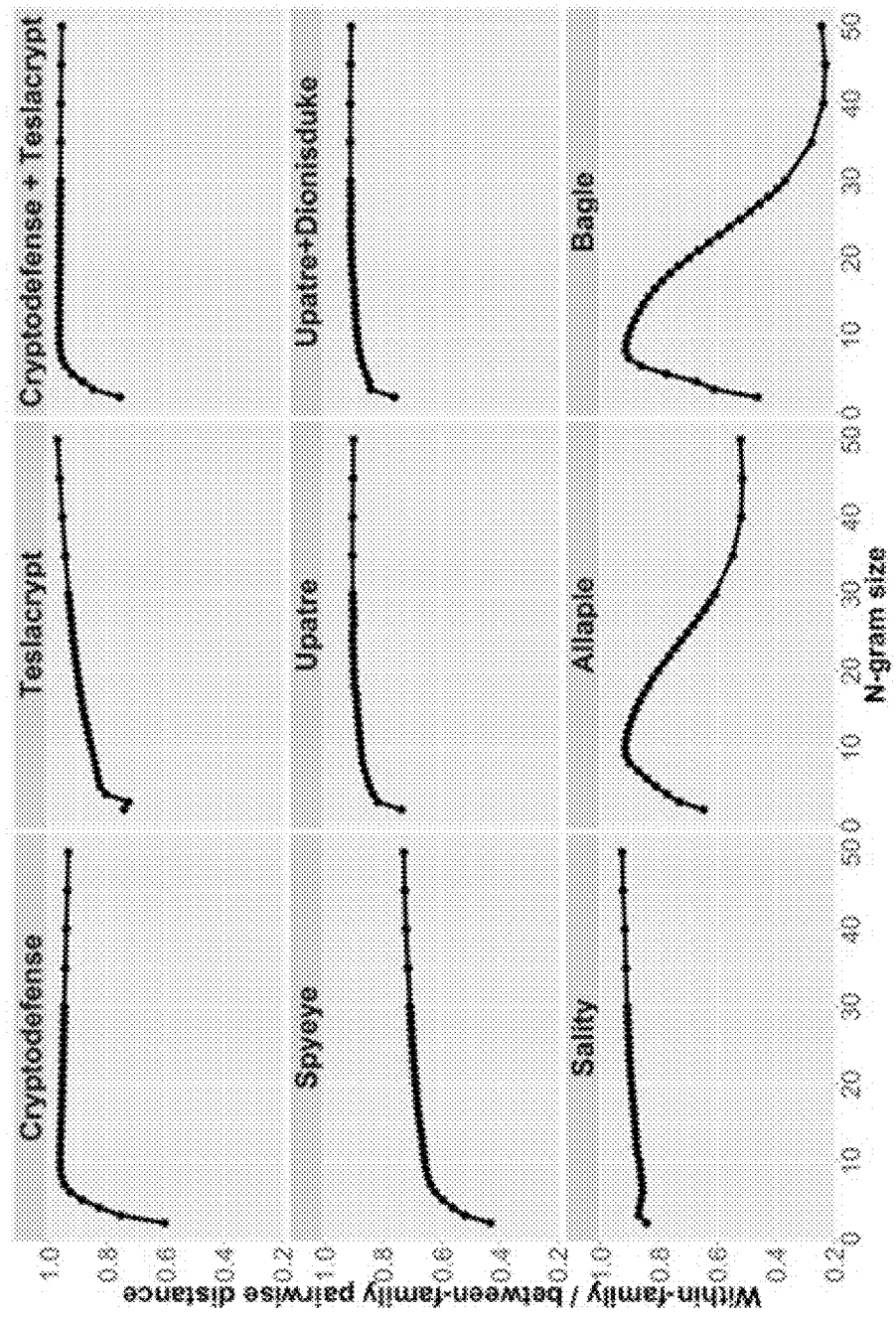
FIG. 14 includes graphs illustrating the effect of n-gram size on the distance ratio, according to an embodiment of the present invention.

Graphs 1400 of FIG. 14 show the effect of n-gram size on the distance ratio between the mean within-family distance and the mean between-family distance for different malware families. The smaller the ratio, the closer the variants are to each other. For most malware families, the distance ratio increases rapidly, and then quickly saturates. For the two worm families, Allaple and Bagle, the distance ratio increases to a peak at approximately n-gram size ten, and then decreases until n-gram size 40.

Figure 15:
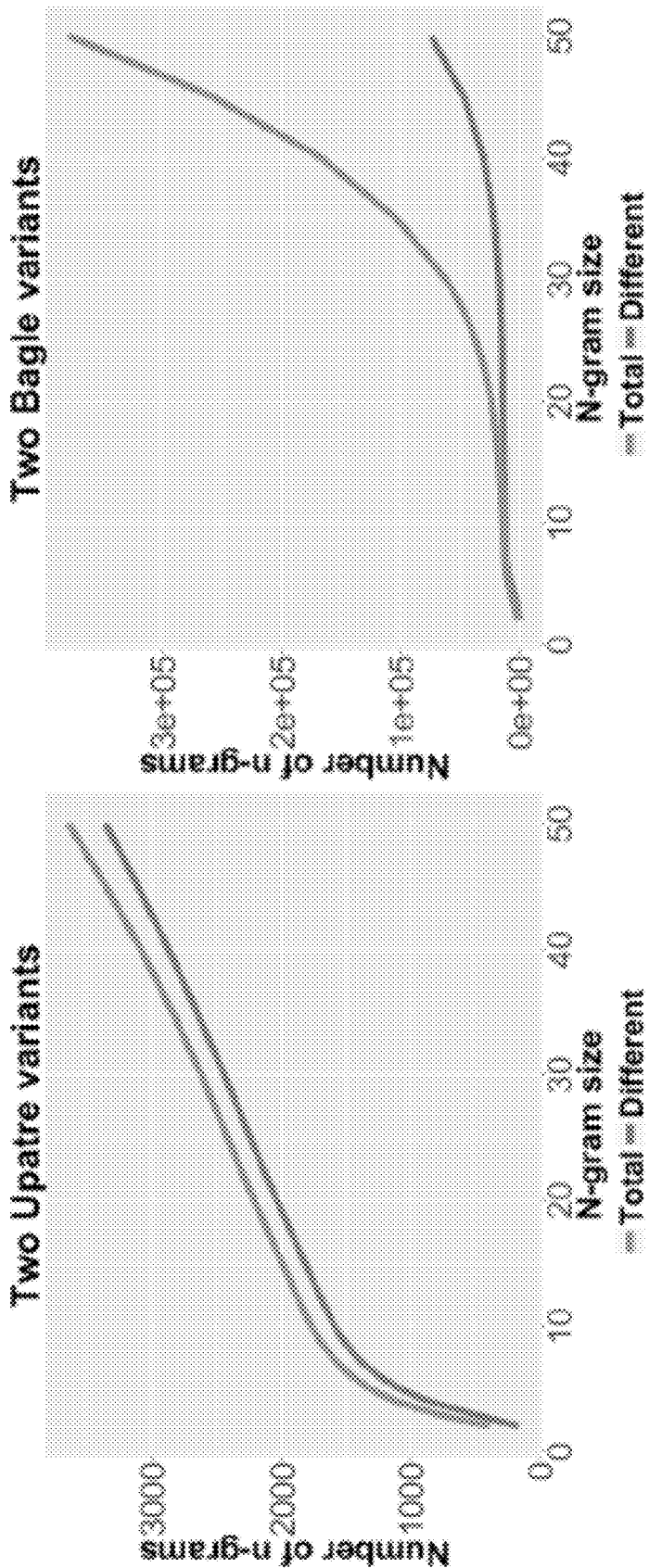
FIG. 15 includes graphs illustrating the number of different n-grams and the total number of n-grams in a pair of Bagle and a pair of Upatre variants, according to an embodiment of the present invention.

To understand the different behavior exhibited by the worm families, it was investigated how the number of different n-grams between a pair of Bagle and a pair of Upatre variants changed with increasing n-gram size. Graphs 1500 of FIG. 15 show that the number of different n-grams and the total number of n-grams increase at the same rate in a pair of Upatre variants. However, the number of different n-grams increases slower than the total number of n-grams in a pair of Bagle variants. This suggests that the dynamic traces of worms differ from other malware types because variants in the same family share long contiguous subsequences of instructions.

Consensus Tree of Phylogenies Most Consistent with AV Classification

Eight optimal phylogenies were previously identified that were equally consistent with the malware classification provided by commercial AV software. The phylogenies were generated using the BP distance measure for n-grams of length six to eight, and BP-IDF distance measure for n-grams of length six to ten. The set of optimal phylogenies was summarized by constructing a 50% consensus tree, shown in graph 1600 of FIG. 16.

In the consensus tree, all variants from the Sinowal, Bagle, Spyeye, Cabby, DionisDuke, Sality and Allaple families form monophyletic groups. The Upatre variants cluster into two groups: the smaller group consists of two Upatre variants (labeled "a" and "b" in the phylogeny), whereas the larger group also includes the DionisDuke family and variants from the Telsacrypt and the Cryptolocker families ("c" and "d" in the phylogeny, respectively). Because the Upatre and DionisDuke families are both downloaders, it is suspected that the group including variants from both families exhibits downloader functionality. This suggests that the Telsacrypt and Cryptolocker variants clustering in this group have been mislabeled by commercial AV software, and are, in fact, downloaders. The other Teslacrypt and Cryptodefense variants cluster together. This group may represent an additional functional classification because both families are forms of ransomware. Variants of the Cabby family, which are also classified as downloaders by AV software, form a tight monophyletic group and appear to be unrelated to other downloaders.

Unfortunately, AV labeling is known to be inconsistent. In fact, one of the Upatre variants that belongs to the large group of downloaders (labeled "e" in the phylogeny) was classified by several AV programs as a variant of the Cryptolocker family. It is suspected that the two Upatre variants that cluster separately from the larger group of Upatres may also be mislabeled.

Classification of Artificial Malware Variants Based on Reference Phylogeny

Figure 16:
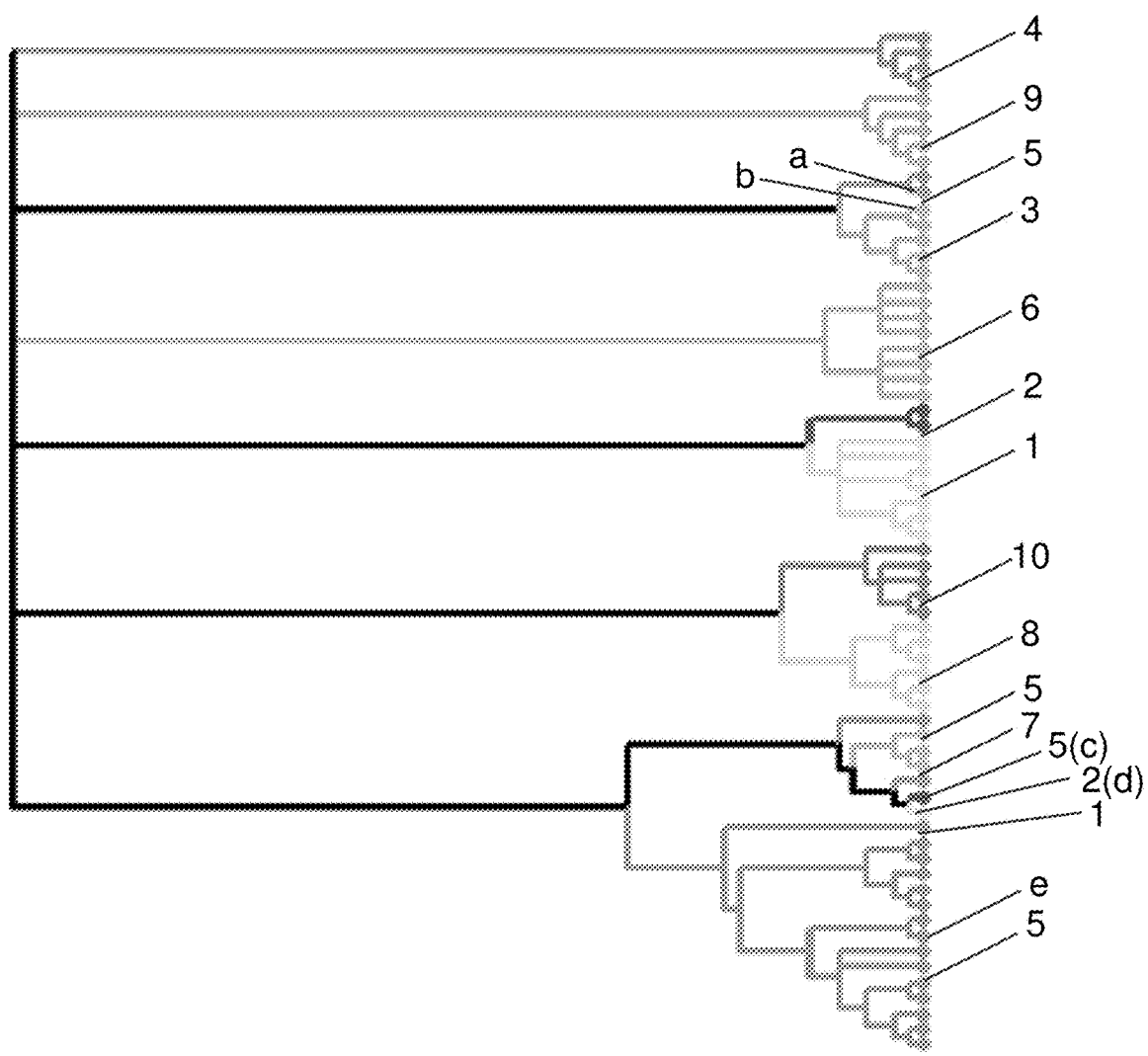
FIG. 16 is a graph illustrating a consensus tree constructed from the set of eight optimal phylogenies, according to an embodiment of the present invention.
Figure 17:
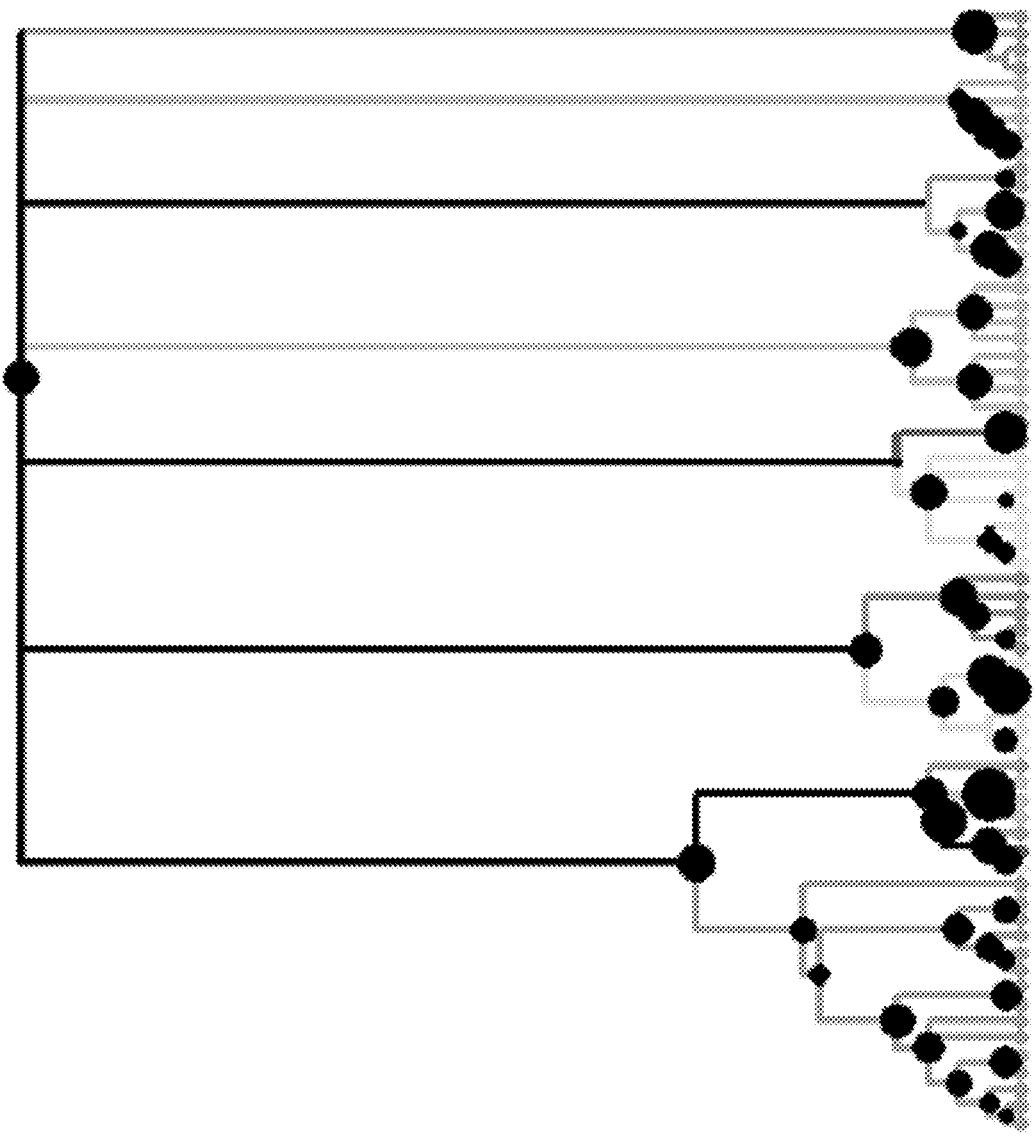
FIG. 17 is a graph illustrating the assignment of 10-gram signatures to the internal nodes of the reference phylogeny, according to an embodiment of the present invention.

Because the signature-based classification method is based on tree topology and ignores branch lengths, the consensus tree in graph 1600 of FIG. 16 can be used as the reference phylogeny. Graph 1700 of FIG. 17 shows the assignment of 10-gram signatures to the internal nodes of the reference phylogeny: the size of the node corresponds to the number of signatures (on log 10 scale) assigned to the node. Some nodes do not have signatures assigned to them. Malware variants that are very similar are not distinguishable from each other if their instruction traces do not contain different n-grams.

Methodology Evaluation Using Mutated Variants

The approach of some embodiments was evaluated by generating mutated variants of the reference malware programs and classifying them against the reference phylogeny. When the mutation rate was increased, the number of n-grams matching signatures assigned to the reference phylogeny decreased. At the highest mutation rate, over 99% of n-grams differed between the artificial and original malware programs at n-gram size seven. The mutant variants retained no original n-grams by n-gram length 13. In contrast, the percentage of different n-grams reached 86% at n-gram size 20 for the second highest mutation rate.

Figure 18:
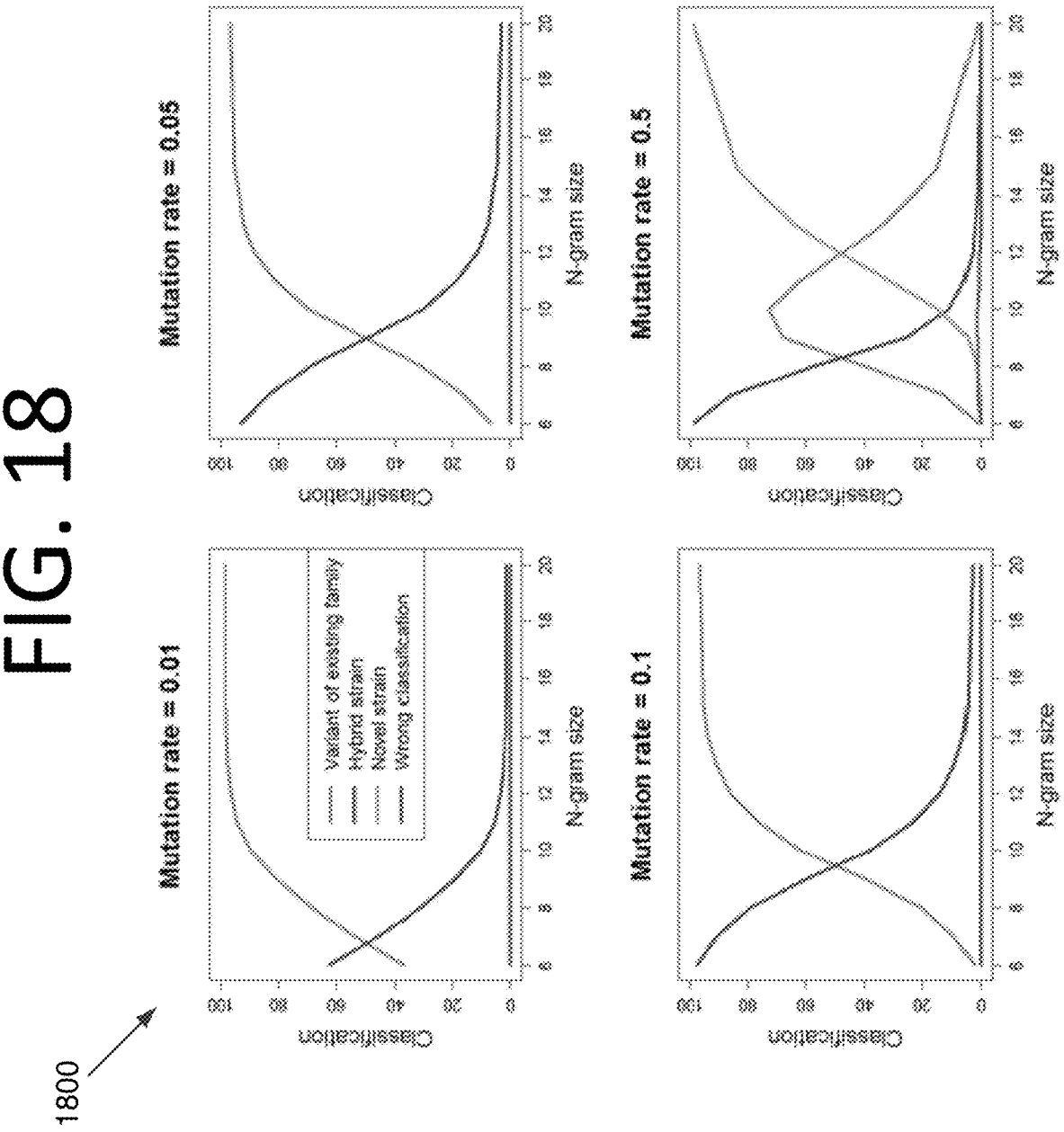
FIG. 18 includes graphs illustrating the percentage of artificial variants synthesized using different mutation rates, according to an embodiment of the present invention.

Graphs 1800 of FIG. 18 show the percentage of artificial variants synthesized using different mutation rates that were classified as: (a) a variant of the original malware family; (b) a hybrid variant of multiple malware families; (c) a novel malware program; and (d) a variant of the wrong malware family. For moderate mutation rates (less than 0.5), the proportion of variants classified correctly to the original family increased with n-gram size. The correct classification exceeded 90% at n-gram size 11 for mutation rate 0.01, and at n-gram size 13 for mutation rates 0.05 and 0.1.

For the highest mutation rate of 0.5, the percentage of variants classified to the original family initially increased until the signature n-gram size reached 11, decreasing to approximately 1% by n-gram size 20. This decrease is explained by fewer n-grams matching signatures on the reference phylogeny as n-gram size was increased. At n-gram size 13, the mutants had on average less than one signature match against the reference phylogeny. Consequently, the number of variants classified as novel programs (no signatures associated with the reference phylogeny) increased with n-gram size when the mutation rate was high.

The proportion of artificial programs classified as hybrids decreased when the signature n-gram size increased for all mutation rates. This is explained by longer signatures being more specific. A mutation is less likely to change a long n-gram into a signature corresponding to another family. The percentage of mutants classified into the wrong family was very low, peaking at 1.6% for n-gram size 9 at the highest mutation rate, demonstrating the robustness of this methodology.

It was also investigated whether the classification corresponded to the closest internal node associated with the original malware program. While the correct classification reached 89% for the lowest mutation rate at n-gram size 13, it does not increase further. This is because some internal nodes on the reference phylogeny did not contain signatures to distinguish between nearly identical variants in the Sinowal and Cabby families.

Methodology Evaluation by Sequential Classification of Reference Malware

Graphs 1900 of FIG. 19 show the classification of a sample of programs from the malware corpus to the nodes of a reference phylogeny for different signature n-gram sizes. As described previously, the malware corpus is initially divided into a reference set consisting of two variants from each malware family, and a reference phylogeny is generated using the binary proportional distance measure based on 10-gram matches. The remaining malware variants are then classified to the nodes of the reference phylogeny, and the reference set is expanded by adding into it a randomly chosen variant from each family. For each n-gram signature size and number of programs in the reference phylogeny, FIG. 19 shows the average percentage of malware classified as: (a) a variant of the correct malware family; (b) a hybrid variant of multiple malware families; (c) a novel malware program; and (d) a variant of the wrong malware family. Importantly, no malware variants are classified to the wrong family for reference phylogenies with at least 35 programs.

The percentage of variants classified to the correct family increased with n-gram size. Increasing the size of the phylogeny also improves classification to the correct family. This results from the signature assignment becoming more specific as signatures that appear in malware variants belonging to multiple families get pushed back in the tree, and no longer cause conflicting paths. In the example depicted in FIG. 8, the Sality variant has signatures belonging to the Bagle and Sality families, and is therefore considered a hybrid. Adding the Sality variant to the reference tree would move the conflicting signature assigned to the Bagle family node to the lowest common ancestor of the Bagle and Sality families, no longer causing a conflicting path for other Bagle and Sality variants containing the signature.

Figure 21:
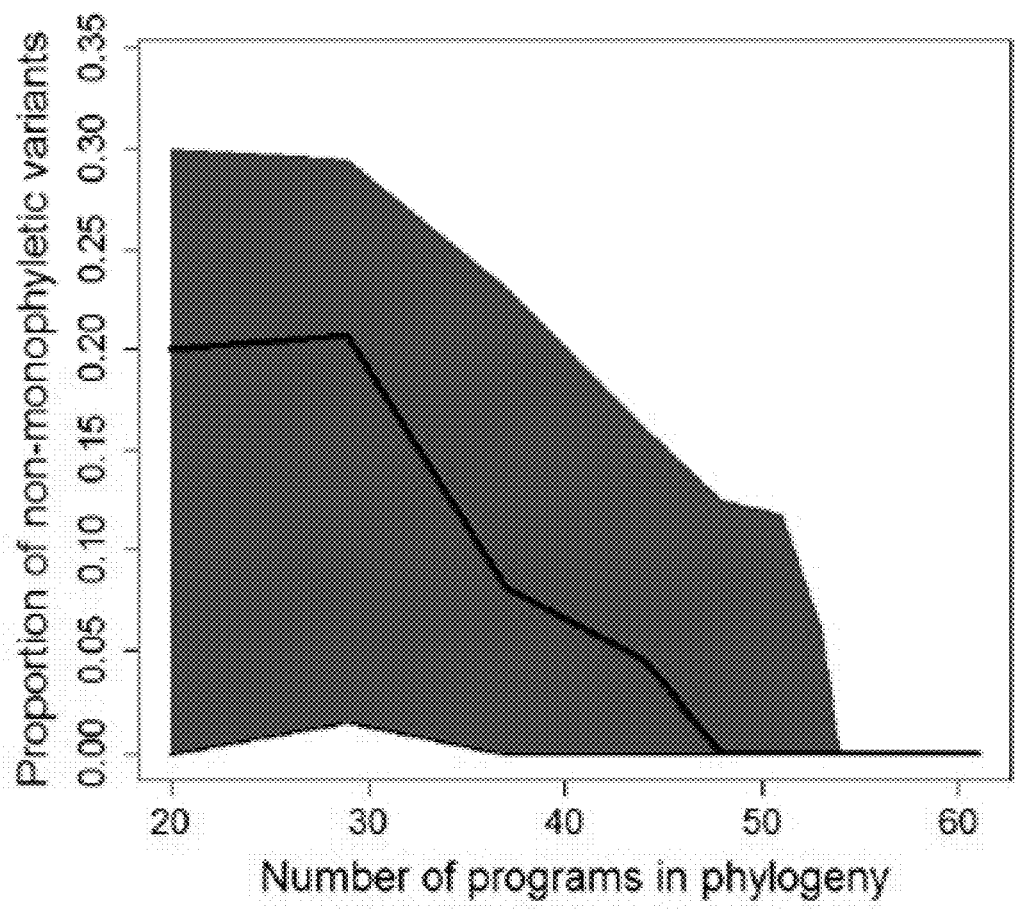
FIG. 21 is a graph illustrating the number of programs in the phylogeny versus the proportion of non-monophyletic variants, according to an embodiment of the present invention.

Graphs 2000 of FIG. 20 illustrate the number of variants added to the phylogeny versus the number of correctly classified variants. When two Cryptolocker variants are included in the reference phylogeny, between 20 to 100% of the remaining five variants are classified to the correct family. Increasing the number of reference Cryptolocker variants to three improves the representativeness of the phylogeny such that the remaining four variants are classified correctly 100% of the time. Graph 2100 of FIG. 21 illustrates the number of programs in the phylogeny versus the proportion of non-monophyletic variants.

Figure 22:
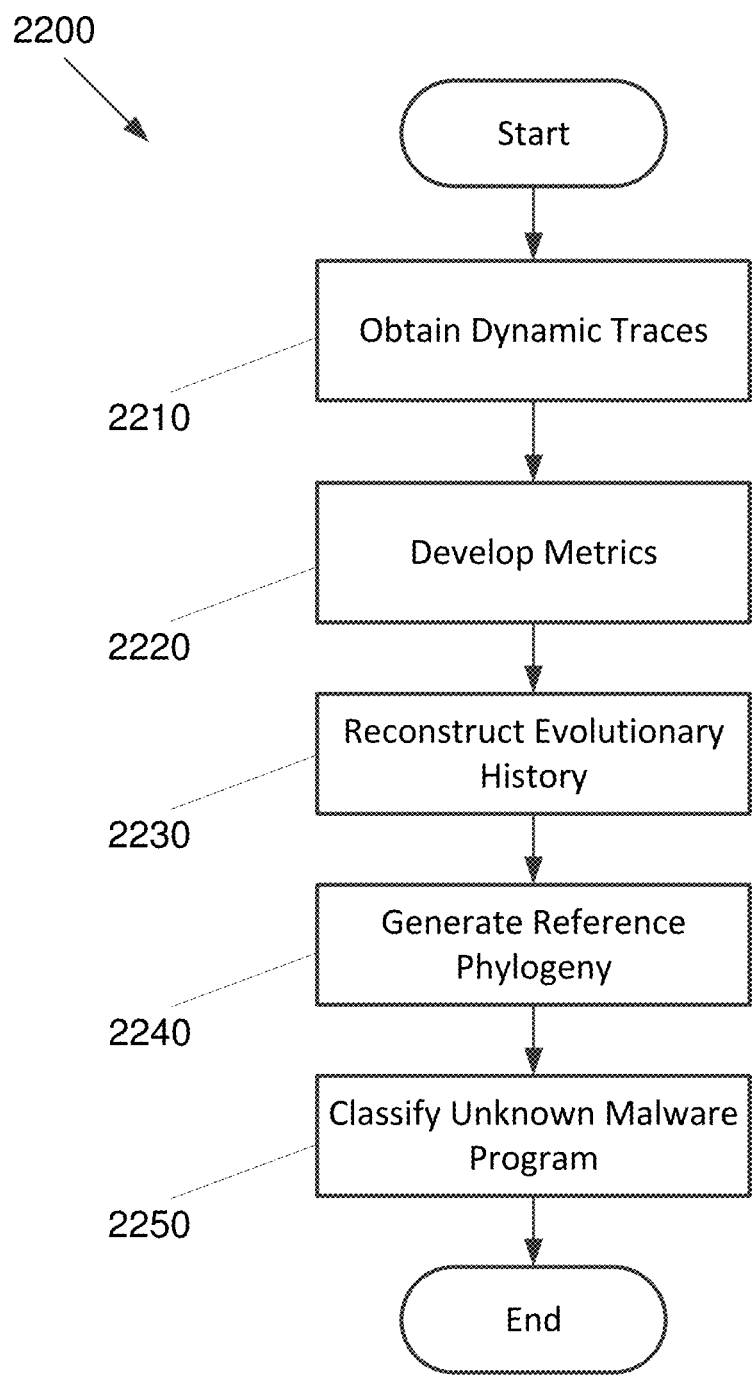
FIG. 22 is a flowchart illustrating a process for classifying malware programs, according to an embodiment of the present invention.

FIG. 22 is a flowchart 2200 illustrating a process for classifying malware programs, according to an embodiment of the present invention. The process begins with obtaining dynamic traces of a representative set of malware programs at 2210. The dynamic traces include time-ordered sequences of execution commands extracted from running malware binaries. Metrics are developed using the dynamic traces at 2220. An evolutionary history and the representative set of malware programs is reconstructed at 2230 and a reference phylogeny is generated at 2240 based on the dynamic traces and developed metrics.

In some embodiments, the reference phylogeny is constructed based on finding matches of similar instruction sequences in the dynamic traces of the representative set of malware programs. In certain embodiments, the construction of the reference phylogeny includes identifying an instruction sequence segment (n-gram) length sufficient to discriminate between programs from different families, and short enough to be present in variants of the same family, comparing different sequence similarity measures to convert an n-gram match distribution of a pair of dynamic traces into a phylogenetic distance, and analyzing whether removing contiguous repeats influences the classification of the dynamic traces. In some embodiments, identification of the instruction sequence segment length includes breaking the dynamic traces into n-grams of instructions and determining one or more most effective lengths for n. In some embodiments, each instruction sequence is divided into a set of n-grams by running a sliding window of length n along the sequence. In certain embodiments, a feature vector is constructed for each malware program, where feature values of the feature vector correspond to the occurrence frequencies of each n-gram in the instruction trace. In some embodiments, the feature vectors may be stored in a character matrix. In certain embodiments, a binary version of the character matrix is generated.

One or more unknown malware programs are then classified against the reference phylogeny at 2250. In some embodiments, the classification of the one or more unknown malware programs includes identifying unique identifier signatures including n-grams extracted from the dynamic traces of the reference malware programs, and assigning the identifier signatures to the nodes of the phylogeny. In certain embodiments, the one or more unknown malware programs are then classified to a most specific node on the reference phylogeny consistent with a set of n-gram signatures it contains. In some embodiments, the classification determines whether the one or more unknown malware programs are variants of an existing family, hybrids of two or more different malware programs, or constitute a new malware strain.

Figure 23:
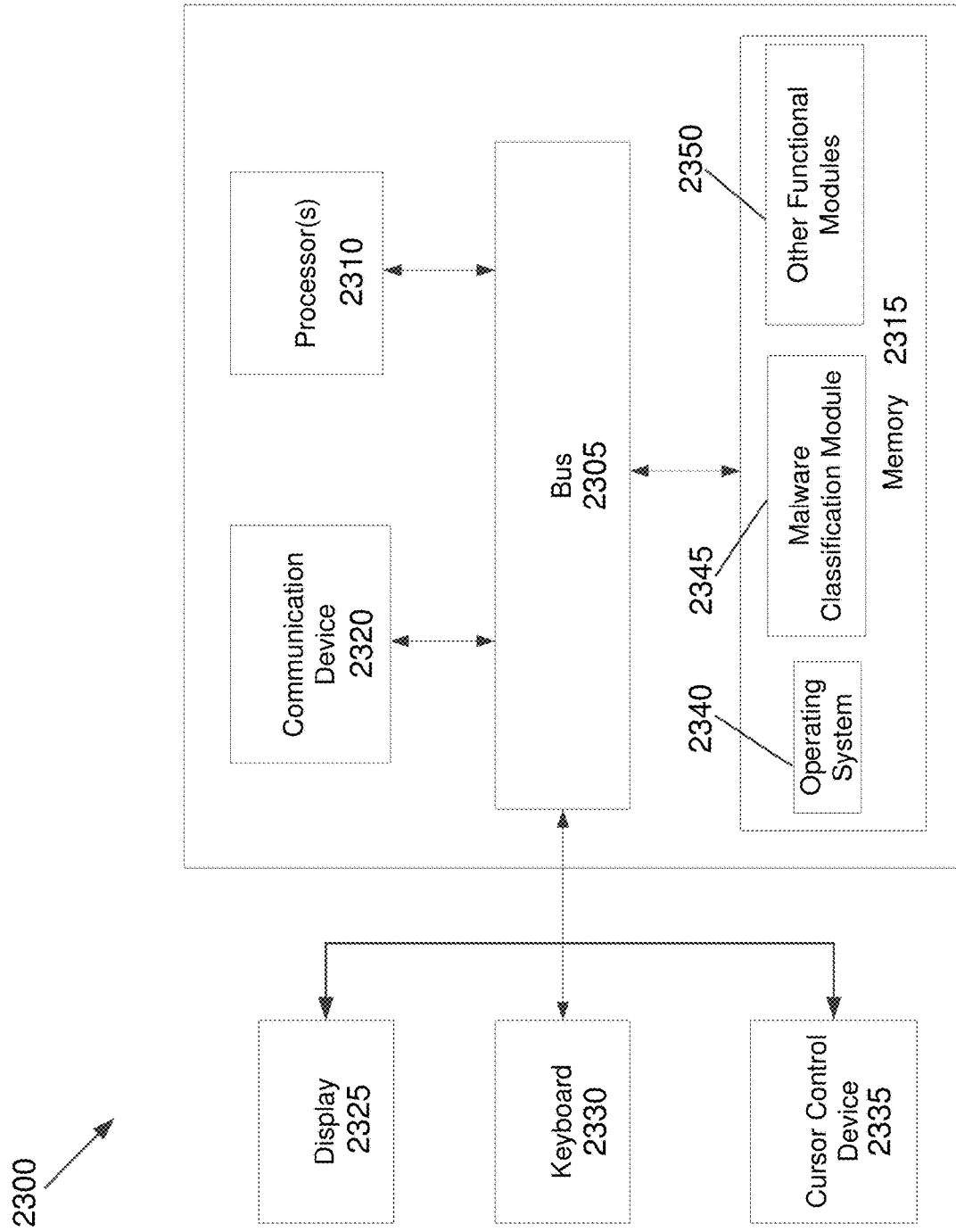
FIG. 23 is a block diagram illustrating a computing system configured to classify malware using phylogenetic techniques, according to an embodiment of the present invention.

FIG. 23 is a block diagram illustrating a computing system 2300 configured to classify malware using phylogenetic techniques, according to an embodiment of the present invention. Computing system 2300 includes a bus 2305 or other communication mechanism for communicating information, and processor(s) 2310 coupled to bus 2305 for processing information. Processor(s) 2310 may be any type of general or specific purpose processor, including a central processing unit ("CPU") or application specific integrated circuit ("ASIC"). Processor(s) 2310 may also have multiple processing cores, and at least some of the cores may be configured to perform specific functions. Multi-parallel processing may be used in some embodiments. Computing system 2300 further includes a memory 2315 for storing information and instructions to be executed by processor(s) 2310. Memory 2315 can be comprised of any combination of random access memory (RAM), read only memory (ROM), flash memory, cache, static storage such as a magnetic or optical disk, or any other types of non-transitory computer-readable media or combinations thereof. Additionally, computing system 2300 includes a communication device 2320, such as a transceiver and antenna, to wirelessly provide access to a communications network.

Non-transitory computer-readable media may be any available media that can be accessed by processor(s) 2310 and may include volatile media, non-volatile media, removable media, and/or non-removable media.

Processor(s) 2310 are further coupled via bus 2305 to a display 2325, such as a Liquid Crystal Display (LCD), for displaying information to a user. A keyboard 2330 and a cursor control device 2335, such as a computer mouse, are further coupled to bus 2305 to enable a user to interface with computing system. However, in certain embodiments such as those for mobile computing implementations, a physical keyboard and mouse may not be present, and the user may interact with the device solely through display 2325 and/or a touchpad (not shown). Any type and combination of input devices may be used as a matter of design choice.

Memory 2315 stores software modules that provide functionality when executed by processor(s) 2310. The modules include an operating system 2340 for computing system 2300. The modules further include a malware classification module 2345 that is configured to classify malware using phylogenetic techniques by employing any of the approaches discussed herein or derivatives thereof. Computing system 2300 may include one or more additional functional modules 2350 that include additional functionality.

One skilled in the art will appreciate that a "system" could be embodied as an embedded computing system, a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIG. 22 may be performed by a computer program, encoding instructions for the non-linear adaptive processor to perform at least the process described in FIG. 22, in accordance with embodiments of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the process described in FIG. 22, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
   obtaining dynamic traces of a representative set of software programs, by a computing system, wherein the dynamic traces comprise time-ordered sequences of execution commands extracted from running software binaries;
   developing metrics, by the computing system, using the dynamic traces;
   reconstructing, by the computing system, an evolutionary history of the representative set of software programs, generating a reference phylogeny based on the dynamic traces and developed metrics; and
   classifying one or more unknown software programs, by the computing system, against the reference phylogeny, wherein
   the construction of the reference phylogeny comprises:
      identifying, by the computing system, an instruction sequence segment (n-gram) length sufficient to discriminate between programs of the representative set of software programs from different families, and short enough to be present in variants of a same family,
      comparing different sequence similarity measures, by the computing system, to convert an n-gram match distribution of a pair of dynamic traces into a phylogenetic distance, and
      analyzing, by the computing system, whether removing contiguous repeats influences classification of the dynamic traces.

2. The computer-implemented method of claim 1, further comprising:
   constructing a feature vector, by the computing system, for each software program in the representative set of software programs, wherein
   feature values of the feature vector correspond to the occurrence frequencies of each n-gram in the dynamic traces.

3. The computer-implemented method of claim 1, wherein the classification of the one or more unknown software programs comprises:
   identifying, by the computing system, unique identifier signatures including n-grams extracted from the dynamic traces of the reference software programs; and
   assigning the identifier signatures, by the computing system, to nodes of the reference phylogeny.

4. The computer-implemented method of claim 1, further comprising:
   classifying the one or more unknown software programs, by the computing system, to a node on the reference phylogeny consistent with a set of n-gram signatures that the one or more unknown software programs contain, wherein
   the classification determines whether the one or more unknown software programs are variants of an existing family, hybrids of two or more different software programs, or constitute a new software strain.

5. The computer-implemented method of claim 1, further comprising:
   calculating, by the computing system, a way that a number of random matches varies with n-gram size is characterized by calculating a relative frequency at which each instruction occurs in the set of dynamic traces extracted from a software corpus;
   determining, by the computing system, mean and maximum lengths of the instruction sequences; and
   calculating, by the computing system, an expected number of n-gram matches in a pair of dynamic traces with arbitrary sequences of instructions, the expected number of n-gram matches in a pair of instruction traces of length L given by:

$$\left(\sum_{j=1}^{N} f_j^2\right)^n L^2$$

where N is a number of instructions.

6. The computer-implemented method of claim 1, further comprising:
   investigating, by the computing system, a number of random matches as a function of n-gram size when n-grams extracted from a dynamic trace are reduced to a unique set by determining an average and maximum number of unique n-grams in reference software programs for each n-gram size;
   constructing, by the computing system, arbitrary unique n-gram sets by sequentially generating n-grams one at a time and removing duplicates until a desired size is reached; and
   calculating, by the computing system, a mean number of matching n-grams for a predetermined number of pairs of average and maximum-sized unique n-gram sets.

7. The computer-implemented method of claim 6, wherein each n-gram is generated by sampling the set of instructions n times with replacement, where a probability of choosing a particular instruction is proportional to a relative frequency of the particular instruction.

8. The computer-implemented method of claim 1, further comprising:
   preprocessing the dynamic traces, by the computing system, removing loops and repeated function calls, wherein all repeating subsequences of at least a predetermined number of contiguous instructions are removed.

9. The computer-implemented method of claim 1, further comprising:
evaluating, by the computing system, an extent to which phylogenies generated by different distance functions and n-gram sizes from original and preprocessed instruction traces correspond to a classification produced by analysis software, wherein
the reference phylogeny comprises phylogenetic trees generated by determining a phylogenetic distance between each pair of software programs in a distance matrix and using a resulting distance matrix to build a neighbor-joining phylogenetic tree, and
the distance matrix is constructed by comparing the n-gram feature vectors extracted from the dynamic traces for each pair of software programs.

10. The computer-implemented method of claim 9, further comprising:
calculating the phylogenetic distance, by the computing system, using a binary proportional (BP) algorithm, a binary proportional-inverse document frequency (BP-IDF) algorithm, a binary cosine similarity-inverse document frequency (BCS-IDF) algorithm, a term frequency cosine similarity-inverse document frequency (TFCS-IDF) algorithm, or any combination thereof.

11. The computer-implemented method of claim 1, further comprising:
assigning signatures, by the computing system, to nodes in the reference phylogeny by extracting features of interest from an instruction sequence of each software program in the representative set of software programs;
building, by the computing system, a binary character matrix from all signatures that are shared by at least two software programs;
finding, by the computing system, a set of descendant leaves for each internal node on the reference phylogeny; and
assigning each signature, by the computing system, to an internal node that is a lowest common ancestor of all leaves that contain the internal node.

12. The computer-implemented method of claim 1, further comprising:
classifying the one or more unknown software programs, by the computing system, to a node on the reference phylogeny by extracting a set of all signatures from the dynamic trace of the one or more unknown software programs;
matching, by the computing system, the signatures of the one or more unknown software programs against signatures on the reference phylogeny; and
identifying, by the computing system, a set of internal nodes that the signatures of the one or more unknown software programs belong to, wherein
when there are no signature matches, a given unknown software program is classified to a root of the tree and considered a potentially novel software program, the reference phylogeny is updated to reflect this increased diversity, and the signatures at the internal nodes of the set of internal nodes are reassigned,
when a set of signature-containing nodes is a subset of internal nodes of the set of internal nodes along a single path from a leaf to the root of the tree, the given unknown software program is classified to a node that is farthest from the root, and
when the set of signature-containing nodes are associated to multiple lineages, the given unknown software program is classified to a lowest common ancestor of nodes that are farthest from the root.

13. The computer-implemented method of claim 1, further comprising:
generating artificially mutated variants of the representative set of software programs, by the computing system, to determine whether they are classified in correct families.

14. A computer-implemented malware classification method, comprising:
constructing a reference phylogeny, by a computing system, based on finding matches of similar instruction sequences in dynamic traces of a representative set of software programs by comparing different sequence similarity measures to convert an n-gram match distribution of a pair of dynamic traces into a phylogenetic distance;
developing metrics, by the computing system, using the dynamic traces; and
classifying one or more unknown software programs, by the computing system, against the reference phylogeny using the metrics developed using the dynamic traces of the representative set of software programs, wherein
the construction of the reference phylogeny comprises:
identifying, by the computing system, an instruction sequence segment (n-gram) length sufficient to discriminate between programs from different families, and short enough to be present in variants of a same family, and
analyzing, by the computing system, whether removing contiguous repeats influences classification of the dynamic traces.

15. A non-transitory computer-readable medium storing a computer program, the computer program configured to cause at least one processor to:
construct a reference phylogeny of a representative set of software programs; and
classify one or more unknown software programs to a node on the reference phylogeny consistent with a set of n-gram signatures that the one or more unknown software programs contain, wherein
the classification determines whether the one or more unknown software programs are variants of an existing family, hybrids of two or more different software programs, or constitute a new software strain, and
the construction of the reference phylogeny further comprises:
identifying, by the computing system, an instruction sequence segment (n-gram) length sufficient to discriminate between programs from different families, and short enough to be present in variants of a same family, and
analyzing, by the computing system, whether removing contiguous repeats influences classification of the dynamic traces.

16. The non-transitory computer-readable medium of claim 15, wherein the computer program is further configured to cause the at least one processor to:
classify the one or more unknown software programs to the most specific node on the reference phylogeny consistent with a set of n-gram signatures that the one or more unknown software programs contain by extracting a set of all signatures from the dynamic trace of the unknown software program;
match the signatures of the one or more unknown software programs against signatures on the reference phylogeny; and identify a set of internal nodes that the signatures of the one or more unknown software programs belong to, wherein when there are no signature matches, a given unknown software program is classified to a root of the tree and considered a potentially novel software program, the reference phylogeny is updated to reflect this increased diversity, and the signatures at the internal nodes of the set of internal nodes are reassigned, when a set of signature-containing nodes is a subset of internal nodes of the set of internal nodes along a single path from a leaf to the root of the tree, the given unknown software program is classified to a node that is farthest from the root, and when the set of signature-containing nodes are associated to multiple lineages, the given unknown software program is classified to a lowest common ancestor of nodes that are farthest from the root.

* * * * *